United States Patent

Hara et al.

[11] Patent Number: 5,838,431
[45] Date of Patent: Nov. 17, 1998

[54] LASER MARKING DEVICE

[75] Inventors: Masato Hara; Satoshi Takami; Teruo Sakai; Noriaki Takahashi; Eiichi Ito, all of Tokyo, Japan

[73] Assignee: Asahi Kogaku Kogyo Kabushiki Kaisha, Tokyo, Japan

[21] Appl. No.: 783,006

[22] Filed: Jan. 14, 1997

[30] Foreign Application Priority Data

Jan. 16, 1996 [JP] Japan .................................. 8-005118
Jan. 16, 1996 [JP] Japan .................................. 8-005119

[51] Int. Cl.$^6$ .............................. G01B 11/26; G01C 5/02
[52] U.S. Cl. ........................ 356/138; 33/290; 33/DIG. 21
[58] Field of Search ............................... 33/284, DIG. 21, 33/290; 356/138

[56] References Cited

U.S. PATENT DOCUMENTS

| 4,830,489 | 5/1989 | Cain et al. | 356/400 |
| 5,144,486 | 9/1992 | Hart | 356/138 |
| 5,212,889 | 5/1993 | Lysen | 33/286 |
| 5,287,365 | 2/1994 | Nielsen et al. | 372/9 |
| 5,610,711 | 3/1997 | Rando | 356/138 |

FOREIGN PATENT DOCUMENTS 3-88678  9/1991  Japan .
4-22943  5/1992  Japan .
5-87571  4/1993  Japan .

*Primary Examiner*—Frank G. Font
*Assistant Examiner*—Zandra V. Smith
*Attorney, Agent, or Firm*—Greenblum & Bernstein, P.L.C.

[57] ABSTRACT

The laser marking device comprises a laser source, an optical system for projecting a laser beam emitted from the laser source to form a laser spot on an object, a light distributing element that is disposed in an optical path of the optical system and includes at least one light distributing portion that distributes a part of the laser beam to form at least one static reference line on the object so that the laser spot is formed on the static reference line, a rotating mechanism that rotates at least a part of the optical system to form a dynamic reference on the object, and a switch for selecting between a rotation mode in which the rotating mechanism is activated and a stationary mode in which said rotating mechanism is not activated.

32 Claims, 25 Drawing Sheets

LASER MARKING DEVICE

BACKGROUND OF THE INVENTION

The present invention relates to a laser marking device that indicates or marks a horizontal or vertical reference line of light on a surface such as a wall of a room.

The reference line allows a user to perform some task such marking the reference line on the wall in ink using a marker or the like.

Two types of laser marking devices are known as prior art. One type is a rotation type marking device in which a projecting portion that emits a laser beam is rotated to form a dynamic reference line on a wall as a locus of the scanning spot. The other type is a line projection type marking device in which a cylindrical lens is used to diverge a laser beam across an arc or sector to form a static reference line on a wall.

In general, either type of reference line can be seen by the naked eye when the distance from the device to the wall is relatively short and the brightness of extraneous light is relatively low. However, since in the rotation type marking device the laser light is distributed through a full arc (360 degrees), the brightness of the dynamic reference line per unit area is generally smaller than that of the static reference line. That is, the line projection type marking device has a wider range of conditions for use with naked eye detection.

With the rotating type marking device, the dynamic reference line can be detected by a light position detecting device that includes light sensors and a detecting circuit to detect a pulsed signal from the sensors that is produced due to the scanning nature of the dynamic reference line. The detecting circuit distinguishes the scanning light from extraneous light based on its pulse frequency. Thus, when the light position detecting device is used, the dynamic reference line can be detected even if the distance between the device and the wall is relatively long and the reference line cannot be seen by the naked eye. However, the use of the light position detecting device can be more troublesome that naked eye detection.

The line projection type marking device has the drawbacks that it cannot form a full arc line for marking the inner walls of a room and that the light position detecting device cannot be used to detect the static reference line since there is no pulsed signal. Thus, the static reference line cannot be detected at all when the distance between the device and the wall is relatively long and the reference line cannot be seen by the naked eye.

SUMMARY OF THE INVENTION

It is therefore an object of the present invention to provide a laser marking device that selectably forms a static reference line for marking relatively short lines or a dynamic reference line for marking full arcs or for operation in conditions where the static reference line is not visible to the naked eye.

According to an aspect of the present invention, the laser marking device comprises a laser source, an optical system for projecting a laser beam emitted from the laser source to form a laser spot on an object, a light distributing element that is disposed in an optical path of the optical system and includes at least one light distributing portion that distributes a part of the laser beam to form at least one static reference line on the object such that the laser spot is formed on the static reference line, a rotating mechanism that rotates at least a part of the optical system to form a dynamic reference line as a locus of the laser spot, and a switch for selecting between a rotation mode in which the rotating mechanism is activated and a stationary mode in which said rotating mechanism is not activated.

The light distributing element may be a lens having power in one direction. The lens may be a cylindrical lens or a GRIN lens. The light distributing element may alternatively be a diffraction grating having power in one direction.

The power of the lens or the diffraction grating is determined such that the static reference line is parallel or perpendicular to the dynamic reference line. In a particular case, a pair of lens portions or a pair of grating portions may be provided to form two static reference lines wherein one of the two static reference lines is parallel to said dynamic reference line and the other is perpendicular to the dynamic reference line.

DETAILED DESCRIPTION OF THE PREFERRED EMBODIMENTS

Preferred embodiments of a laser marking device of the resent invention are described hereinafter.

Figure 1:
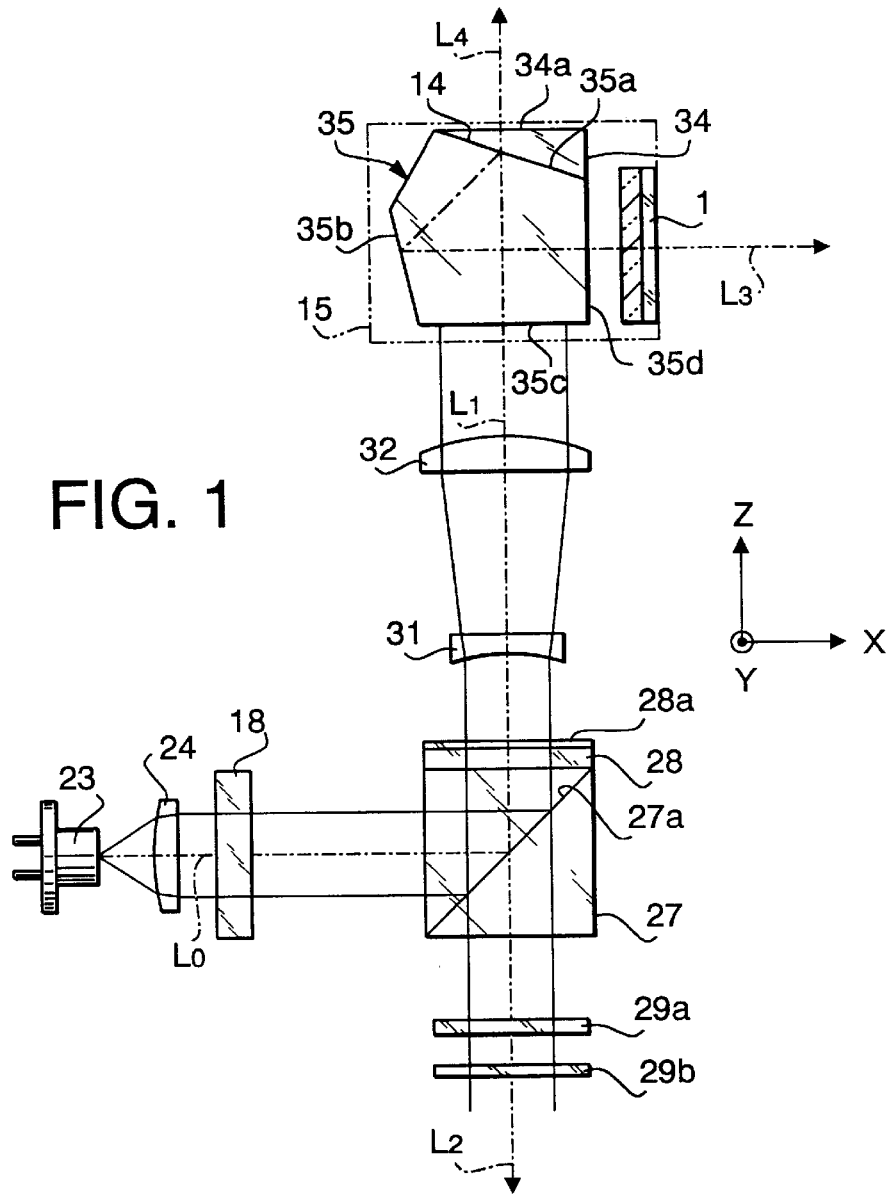
FIG. 1 shows an optical system of a laser marking device according to a first embodiment.

As shown in FIG. 1, an optical system of the laser marking device according to the first embodiment includes a semiconductor laser 23 as a light source, a polarizing beam splitter 27 and a projecting unit 15.

A collimator lens 24 and a cylindrical lens 18 are located between the semiconductor laser 23 and the polarizing beam splitter 27. A laser beam L0 emitted from the semiconductor laser 23 is converted to a substantially parallel beam by the collimator lens 24 and the sectional shape of the beam is adjusted to a circular shape by the cylindrical lens 18.

The semiconductor laser 23 is positioned so that the laser beam is incident to the polarizing beam splitter 27 as an S-polarized beam with respect to a splitting surface 27a of the polarizing beam splitter 27. The splitting surface 27a reflects the S-polarized component by 100% arid transmits the P-polarized component by 100% at the wavelength of the laser beam. The normal of the splitting surface 27a forms a 45 degree angle with the optical axis of the collimator lens 24 that coincides with the central axis of the laser beam L0. And therefore, the incident light is fully reflected by the splitting surface 27a and the reflected light L1 is directed to the projecting unit 15.

A quarter wave plate 28 is attached on a surface of the polarizing beam splitter 27 from which the reflected light from the splitting surface 27a exits. A transmitting surface of the quarter wave plate 28 that is opposite to the polarizing beam splitter 27 is coated with a translucent layer 28a. The S-polarized light reflected by the splitting surface 27a is incident into the quarter wave plate 28 and is converted to circularly polarized light. A portion of the circularly polarized light is reflected by the translucent layer 28a and is transmitted back through the quarter wave plate 28. The transmitted light is thus converted to P-polarized light and is fully transmitted through the splitting surface 27a. The transmitted laser beam L2 that passes through the polarizing beam splitter 27 penetrates a pair of wedge prisms 29a and 29b and exits from the device to form a spot on a floor. The spot may be used to determine the position of the device with respect to a reference point on the floor.

A Galilean type beam expander that consists of a negative front lens 31 and a positive rear lens 32 are located between the polarizing beam splitter 27 and the projecting unit 15. The diameter of the laser beam L1 that is reflected by the splitting surface 27a and transmits through the quarter wave plate 28 and the translucent layer 28a is enlarged by the beam expander. The front lens 31 is adjustable along the optical axis thereof to adjust the position of the beam waist of a laser beam L3 projected by the projecting portion 15. That is, adjusts the position at which the projected laser beam L3 converges to its smallest diameter.

The projecting unit 15 includes a pentagonal prism 35, a wedge prism 34 and a light distributing lens 1 as a light distributing element. The unit 15 is driven by a rotation mechanism (described later) to rotate about a rotation axis that coincides with the central axis of the laser beam L1.

The pentagonal prism 35 provides an incident side surface 35c from which the laser beam L1 enters into the pentagonal prism 35, a first reflecting surface 35a that is inclined by 22.5 degrees with respect to the incident side surface 35c, a second reflecting surface 35b that is inclined by 45 degrees with respect to the first reflecting surface 35a and an exit side surface 35d that is perpendicular to the incident side surface 35c. The first reflecting surface 35a is coated by a translucent layer 14. The wedge prism 34 is attached to the first reflecting surface 35a. An exit side surface 34a of the wedge prism 34 is formed so as to be parallel to the incident side surface 35c.

The laser beam L1 incident on the incident side surface 35c of the pentagonal prism 35 strikes the first reflecting surface 35a and enters the translucent layer 14 that has 70–80% reflectivity. The laser beam L1 is divided into two beams L3 and L4 at the first reflecting surface 35a. The projected laser beam L3, which exits from the exit side surface 35d after reflections by the first reflecting surface 35a and the second reflecting surface 35b, has an intensity of 70–80% of the laser beam L1. The laser beam L3 passes the light distributing lens 1 and forms a marking pattern on a wall. The exit direction of the laser beam L3 changes as the projecting unit 15 rotates.

In the figures, an X-Y-Z coordinate system is defined as shown. The X direction is parallel to the direction of the laser beam L0, the Z direction is parallel to the direction of the laser beam L1 and the Y direction is perpendicular to the X-Z plane. The projecting unit 15 rotates about an axis that is parallel to the Z direction and causes the laser beam L3 to scan within a plane parallel to the X-Y plane. In the following description a direction parallel to the Y direction is defined as a horizontal direction, a direction parallel to the Z direction is defined as a vertical direction.

The laser beam L4, which exits from the exit surface 34a of the wedge prism 34, has intensity of 20–30% of the laser beam L1. The laser beam L4 exits from the device to form a spot on a ceiling. The spot may be used to determine the position of the device with respect to a reference point on the ceiling.

Figure 2:
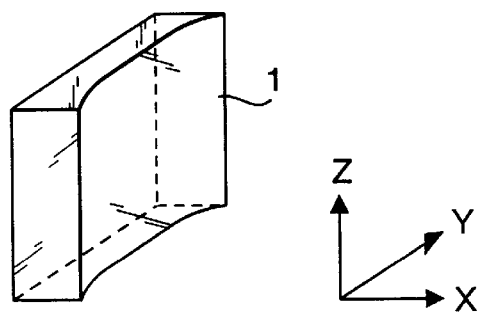
FIG. 2 is a perspective view of a light distributing lens of the first embodiment.
Figure 3:
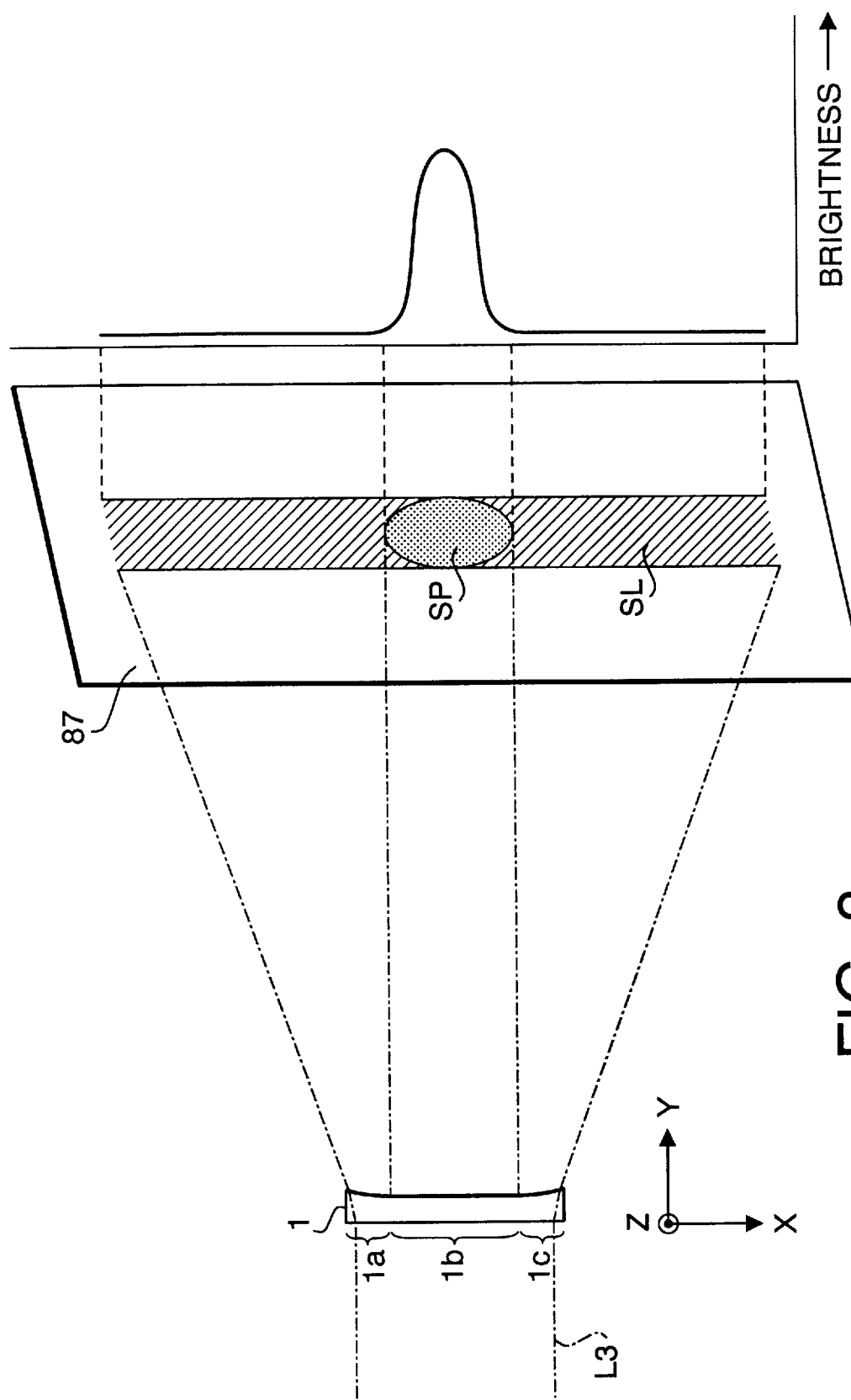
FIG. 3 illustrates a function of the light distributing lens of the first embodiment.

As shown in FIGS. 2 and 3, the light distributing lens 1 is a one piece lens that has a central flat portion 1b and peripheral cylindrical lens portions 1a and 1c that are located at the sides of the flat portion 1b. The boundaries separating the portions 1a, 1b and 1c are parallel to the Z direction. The cylindrical lens portions 1a and 1c have negative power only in the Y direction in order to diverge the peripheral portions of the laser beam L3 in the horizontal direction. That is, generatrices of the cylindrical lens portions 1a and 1b are parallel to the z direction. The flat portion 1b is a parallel flat plate having no power.

The central portion of the laser beam L3 incident on the flat portion 1b of the light distributing lens 1 is not refracted and passes the lens 1 to form a spot SP on a wall 87 in the same manner as a conventional rotation type marking device. The peripheral portions of the laser beam L3 incident in the cylindrical lens portions 1a and 1c are diverged by the lens 1 to form a static reference line SL at both sides of the spot SP along the Y direction on the wall 87 similar to a conventional line projection type marking device. As shown in a graph in FIG. 3, the static line SL has relatively low brightness and the spot SP has relatively high brightness.

Figure 4:
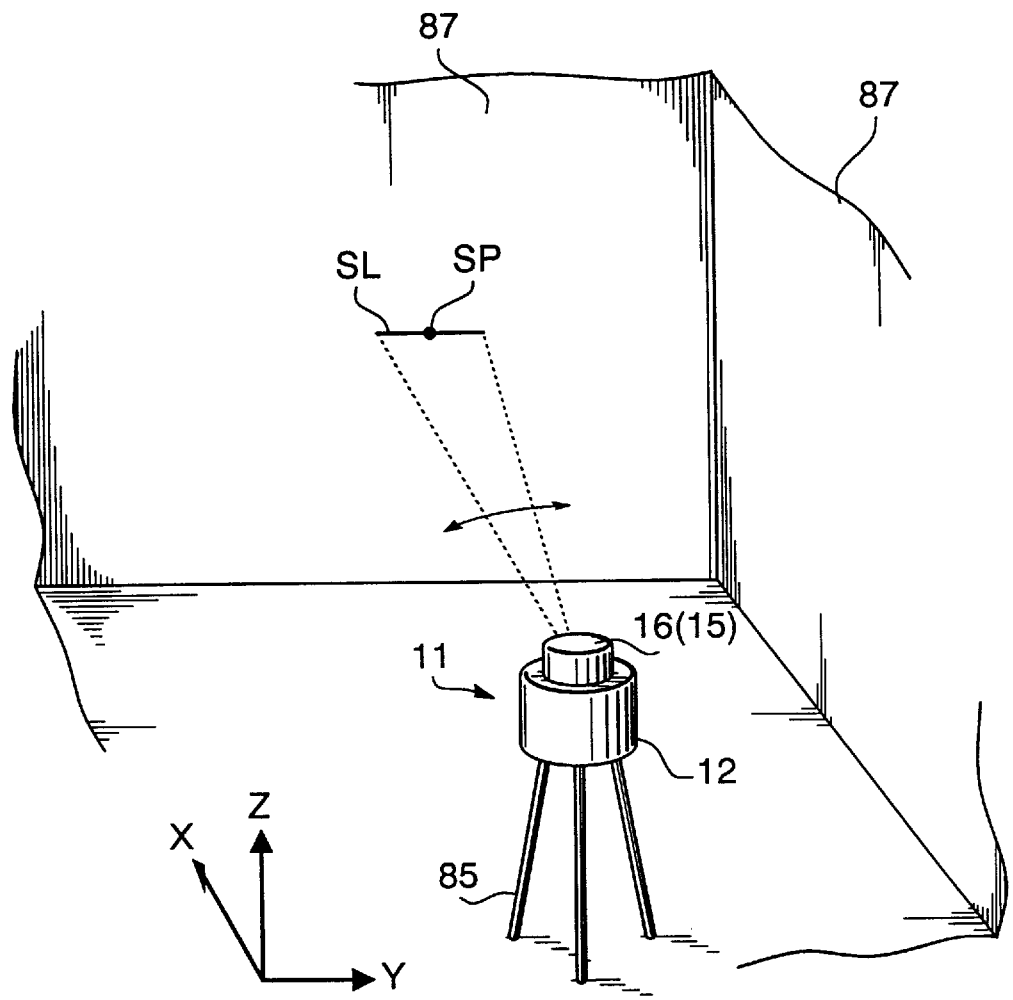
FIG. 4 is a perspective view of the laser marking device of the first embodiment.

As shown in FIG. 4, the laser marking device 11 includes a lower housing 12 in which the optical elements of FIG. 1 except the projecting unit 15 are installed, an upper housing 16 that is mounted on the lower housing 12 and houses the projecting unit 15, and a tripod 85 for supporting the lower housing 12. The projected laser beam passes through a transparent window (described later) of the upper housing 16 and forms the marking pattern on the wall 87. When the projecting unit 15 is not rotated, the marking pattern consists of the static line SL and the spot SP. When the projecting unit 15 is rotated, the marking pattern is formed as a dynamic reference line that is a locus of the spot SP as the exit direction of the laser beam changes due to the rotation of the projecting unit 15. The dynamic reference line is formed along the horizontal direction.

Figure 5:
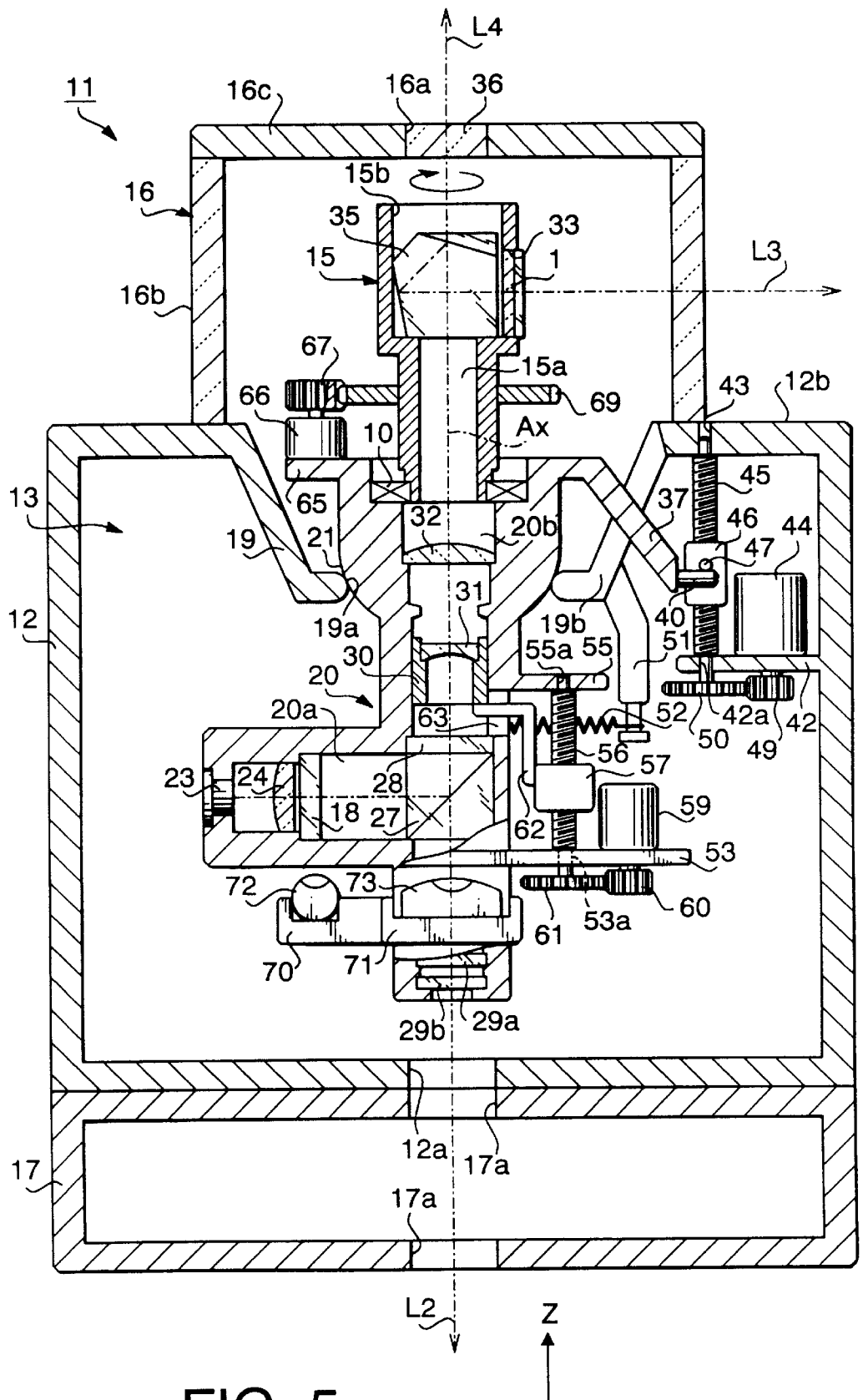
FIG. 5 is a sectional view of the laser marking device of the first embodiment.

An example mechanical construction of the laser marking device 11 is illustrated in FIG. 5. The laser marking device 11 includes the lower housing 12 having a cylindrical shape, the upper housing 16 that is mounted on the lower housing 12, an optical unit 13 that is supported inside of the lower housing 12 and the upper housing unit 16, and a battery case 17 that is attached under the lower housing 12 to hold a battery (not shown).

The optical unit 13 includes the optical elements shown in FIG. 1, a main body 20, and a bearing 10. The projecting unit 15 is rotatably mounted on the main body 20 via the bearing 10.

In the main body 20 of the optical unit 13, a first optical path 20a is formed along the X direction and a second optical path 20b is formed so as to be perpendicular to the first optical path 20a and to extend along the Z direction. The semiconductor laser 23, the collimator lens 24 and the cylindrical lens 18 are fixed in the first optical path 20a. The polarizing beam splitter 27, the quarter wave plate 28, the rear lens 32 and the wedge prisms 29a and 29b are fixed in the second optical path 20b. The front lens 31 is supported by the movable lens barrel 30 such that the front lens 31 is moveable along the Z direction.

A third optical path 15a is formed in the projecting unit 15 that is connected with the second optical path 20b. The projecting unit 15 is also provided with a prism holding portion 15b that holds the pentagonal prism 35 and a lens holding portion 33 that holds the light distributing lens 1.

The upper housing 16 includes a transparent window 16b having a cylindrical shape that surrounds the projecting unit 15 and a top panel 16c that covers a top opening of the window 16b. Additionally, a cover glass 36 fits in a center hole 16a of the top plate 16c in order to allow the transmission of the laser beam L4 directed to the ceiling.

The lower housing 12 and the battery case 17 have circular holes 12a and 17a through which the laser beam L2 passes directed to the floor.

In order to support the optical unit 13, a conical slide portion 19 is formed at the center of an upper plate 12b of the lower housing 12. An opening hole 19a is formed at the bottom of the conical slide portion 19 to contact a spherical outer surface 21 of the main body 20. The optical unit 13 is supported by this connection and the angle of inclination thereof is adjustable in the X and Y directions. The inclination in each of the X and Y directions is defined as a rotation about each of these axes parallel to the Y and X directions respectively. The center of rotation of the optical unit 13 coincides with the center of curvature of the spherical outer surface 21.

The angle of the optical unit 13 is adjusted by level adjusting mechanisms for the X and Y directions. In FIG. 5, only the level adjusting mechanism in the X direction is shown. The level adjusting mechanism in the X direction comprises an arm portion 37 that extends from an upper portion of the main body 20, and a driving mechanism to move tip end of the arm portion 37.

The driving mechanism includes a level adjusting motor 44 that is mounted on a bracket 42 formed at an inside of the lower housing 12 and directed toward the optical unit 13.

The motor 44 rotates a screw rod 45 that is supported between the upper panel 12b of the lower housing 12 and the bracket 42. The upper insertion axis of the screw rod 45 is inserted in a supporting hole 43 formed on the upper panel 12b. The lower insertion axis of the screw rod 45 pierces a supporting hole 42a and a gear 50 is attached thereto. A pinion 49 that engages with the gear 50 is fixed to the rotating axis of the motor 44 in order to transmit the rotation of the motor 44 to the screw rod 45. A nut 46 is screwed to the screw rod 45 and includes an operation pin 47 that is in contact with a pin 40 that is attached to the tip end of the arm portion 37 so that the nut 46 does not rotate but moves along the Z direction as the screw rod 45 rotates due to the rotation of the motor 44.

On the other hand, the arm portion 37 extends through a slit 19b of the conical slide portion 19 toward the bracket 42. The pin 40 is fixed on the tip end of the arm portion 37 such that the pin 40 is directed to the center of curvature of the spherical outer surface 21. The pin 40 is in contact with a lower side of the operation pin 47 that is fixed to the nut 46.

In the same manner, the level adjusting mechanism in the Y direction is arranged at a position apart from the above described driving mechanism for the X direction by 90 degrees in the X-Y plane. A spring supporting rod 51 is fixed to the lower housing 12 at an intermediate position between the level adjusting mechanisms for the X and Y directions. A tension spring 52 is applied between the lower portion of the main body 20 and the spring supporting rod 51 The tension spring 52 gives a bias force to the main body 20 so that the arm portions (37) of the level adjusting mechanisms are biased to move upward. Note that the parentheses ( ) around the reference numeral indicates that this discussion applies to both the level adjusting mechanism for the X direction (shown) and for the Y direction (not shown).

Since the pins (40) of the arm portions (37) are in contact with the lower sides of the operation pins (47) due to the biasing of the tension spring 52, the pins (40) move to adjust the inclination of the optical unit 13 as the operation pins (47) move.

A gear 69 is fixed around the projecting unit 15. As described above, the projecting unit 15 is rotatably attached to the main body 20 via the bearing 10. The gear 69 engages with a pinion 67 that is fixed to a rotation axis of a projecting unit driving motor 66. The motor 66 is mounted on a bracket 65 formed on the upper portion of the main body 20. The projecting unit 15 rotates as the motor 66 is driven.

The movable lens barrel 30 that supports the front lens 31 is driven by a focusing mechanism.

At a middle portion of the main body 20, a pair of brackets 53 and 55 are formed with a predetermined distance therebetween. A focusing motor 59 is mounted on the lower bracket 53. The motor 59 rotates a screw rod 56 that is supported between the upper bracket 55 and the lower bracket 53. The upper insertion axis of the screw rod 56 is inserted in a supporting hole 55a formed on the upper bracket 55. The lower insertion axis of the screw rod 56 pierces a supporting hole 53a and a gear 61 is attached thereto. A pinion 60 that engages with the gear 61 is fixed to the rotating axis of the motor 59 in order to transmit the rotation of the motor 59 to the screw rod 56.

The movable lens barrel 30 is connected with a transmission link 62 that extends outward, outside of the light path 20b, via a slit 63. The transmission link 62 is also connected to a nut 57 that is screwed to the screw rod 56. The front lens 31 moves along the optical axis thereof as the nut 57 moves in the Z direction due to the rotation of the screw rod 56.

At the bottom portion of the main body 20, holding portions 70 and 71 are fixed to hold sensors 72 and 73 for detecting the amount of inclination in the Y and X directions respectively.

Figure 6:
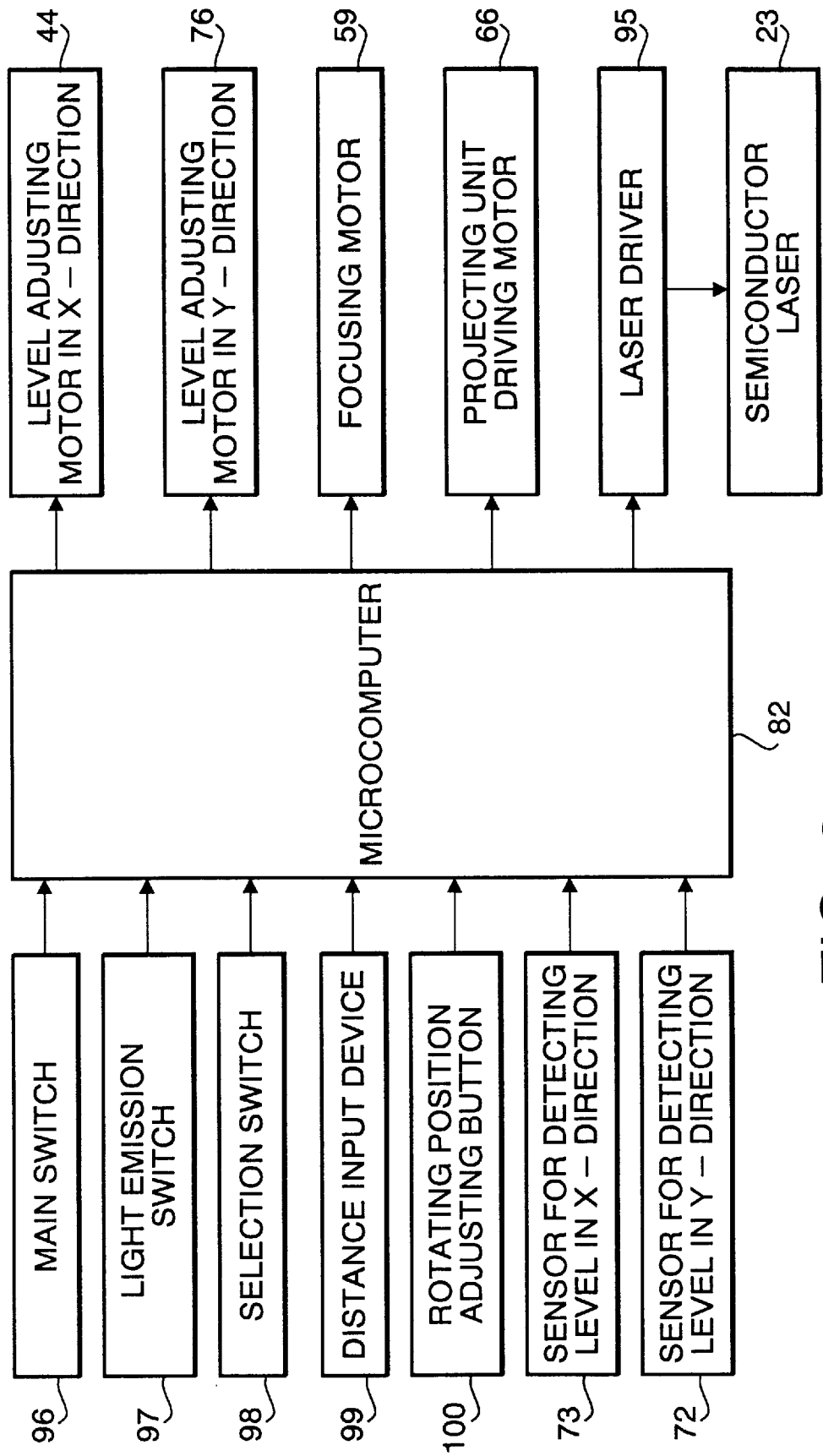
FIG. 6 is a block diagram of a controlling system of the laser marking device of the first embodiment.

FIG. 6 shows a controlling system of the laser marking device of the first embodiment. The controlling system is provided with a microcomputer 82 to control the various motors described above and the semiconductor laser 23 according to instructions that are input from various input devices, described below.

A main switch 96 switches the microcomputer 82 ON or OFF. Other controls (described below) are effective only when the main switch is ON. When the main switch 96 is turned ON, the microcomputer 82 obtains data from the sensors 72 and 73 for detecting the inclination in the Y and X directions, and the microcomputer 82 controls the level adjusting motors 44 and 76 so that the rotation axis AX of the optical unit 13 is vertical (that is, aligned with the direction of gravitation).

A light emission switch 97 switches the semiconductor laser 23 ON or OFF. When the light emission switch 97 is turned ON, the microcomputer 82 controls the laser driver 95 to make the semiconductor laser 23 emit a laser beam.

A selection switch 98 switches the rotation of the projecting unit 15 ON or OFF. When the selection switch 98 is turned ON, the microcomputer 82 controls the projecting unit driving motor 66 to rotate the projecting portion 15. When the selection switch 98 is turned OFF, the microcomputer 82 controls the motor 66 to stop. Thus, the selection switch 98 is for switching a status of the rotating mechanism between a rotation mode and a stationary mode.

A distance input device 99 is, for example, a ten key keypad or a dial, to input the distance between the laser marking device 11 and the wall 87. The microcomputer 82 drives the focusing motor 59 based on the distance input by the distance input device 99 so that the beam waist of the projected laser beam L3 coincides with the wall.

A rotating position adjusting button 100 turns the stepwise rotation of the projecting unit 15 ON or OFF This rotating position adjusting button 100 is only effective when the projecting unit 15 is not rotating When the rotating position adjusting button 100 is ON, the microcomputer 82 controls the projecting unit driving motor 66 to rotate the projecting unit 15 by a predetermined angle. The predetermined angle of the stepwise rotation is determined to be smaller than the divergent angle of the laser beam L3 by the light distributing lens 1.

The operation of the laser marking device 11 according to the first embodiment will be described next.

At the first step, the tripod 85 is set such that the projecting direction of the laser beam L3 is directed to the wall 87 as shown in FIG. 4. The length of the legs of the tripod 85 may be adjusted to change the height of the window 16b so as to coincide with the height of the position where the static reference line SL should be formed.

At the second step, the main switch 96 is turned ON. The microcomputer B2 obtains the data from the sensors 73 and 72 and controls the level adjusting motors 44 and 76 so that the rotation axis AX of the optical unit 13 is vertical.

At the third step, the light emission switch 97 is turned ON to make the semiconductor laser 23 emit the laser beam L0. This laser beam L0 is divided into the laser beam L2 directed to the floor, the laser beam L3 directed to the wall 87 and the laser beam L4 directed to the ceiling. A user can adjust the laser marking device 11 with respect to the reference point on the floor or the ceiling with reference to the spot formed by the laser beam L2 or L4. The laser beam L3 passes the light distributing lens 1 and forms the spot SP and the static reference line SL on the wall 87.

At the fourth step, the distance between the laser marking device 11 and the wall 87 is input by the distance input device 99. The microcomputer 82 determines the appropriate position of the front lens 31 with respect to the input distance and drives the focusing motor 59 to set the front lens 31 at the appropriate position. After this focusing operation, the size of the spot SP and the width of the static reference line SL are a minimum and the brightness per unit area of the spot SP and the static reference line SL are a maximum for the input distance.

Once the setting of the laser marking device 11 is finished by following the above four steps the user can use the laser marking device in various ways. When the required marking area is small and the static reference line SL can be seen by the naked eye, the marking line can be traced by the user using a marker to mark the line in ink. If the static reference line SL is not exactly in the required marking position, the user can push the rotating position adjusting button 100 until the static reference line SL is formed on the required marking position.

If the static reference line SL cannot be seen by the naked eye due to the distance or extraneous light, the selection switch 98 can be turned ON to form the dynamic reference line as an afterimage of the locus of the spot SP. Although the brightness of the dynamic reference line is lower than that of the static reference line SL, the dynamic reference line can be detected by using a light position detecting device that includes sensors to receive a scanning light and a detecting circuit to detect a pulse signal from the sensors. Preferably, the detecting circuit also distinguishes the frequency of the scanning light from an extraneous light. A user can then detect the dynamic reference line by using the light position detecting device and trace the line using a marker.

To form a full arc (i.e. 360 degrees) marking line, the selection switch 98 is turned ON to form the dynamic reference line. As above, the dynamic reference line can be seen by the naked eye when the distance from the device 11 to the wall 87 is relatively short and the brightness of extraneous light is relatively low. Also as above, if the dynamic reference line cannot be seen by the naked eye, it can be detected by the light position detecting device.

With the laser marking device 11 of the present embodiment, since the spot SP is formed by a part of the laser beam that is not diverged by the cylindrical lens portions, the dynamic reference line formed by the spot has a periodic intensity that is higher than a predetermined threshold level of the light position detecting device (i.e. when the scanning laser beam passes over the light position detecting device). On the contrary, even if a static reference line formed by a conventional line projection type marking device is scanned in a full arc, the light position detecting device cannot detect such a reference line because the intensity of the line is lower than the threshold level (i.e. there will be no periodic pulse with higher intensity since the laser beam is diverged across an arc).

Additionally, the angle of sector formed by the divergent portion of the laser beam of the laser marking device 11 is designed to be smaller than that of the conventional line projection type marking device since, if necessary, the projecting unit 15 can be rotated to move the static reference line SL easily. Furthermore, the brightness of the static reference line SL is higher than that of the dynamic reference line formed by the spot SP such that the distance between the device 11 and the wall 87 at which naked eye detection of the static reference line SL is longer than that for the dynamic reference line.

The rotation of the projecting unit driving motor 66 is constant when forming the dynamic reference line. This prevents the displacement of the dynamic reference line due to the vibration of the device and reduces the amount of electricity used.

FIGS. 7 through 32 show variations of the first embodiment. In the first embodiment, the static reference line SL is formed in the horizontal direction and coincides with the dynamic reference line. Additionally, the light distributing lens 1 has the central flat portion 1b having no power and the peripheral cylindrical lens portions 1a and 1c having negative power. Further, the light distributing lens 1 is a one piece lens that covers the entire section of the laser beam L3.

However, the static reference line SL may instead extend along the vertical direction that is perpendicular to the dynamic reference line or two static reference lines may be formed to extend as crossed lines along the horizontal and vertical directions. Further, with regard to the light distributing lens 1, the peripheral cylindrical lens portions 1a and 1c may have positive power, or a cylindrical lens portion may be positioned at only one side of the central flat portion 1b. Additionally, the central flat portion 1b may be replaced by forming a space in which no lens material is positioned.

In the variations described, the arrangements or the construction of the light distributing lenses are different from the first embodiment, however, the other features including arrangement of the optical elements, the mechanical construction and the controlling system are identical with that of the first embodiment.

Figure 7:
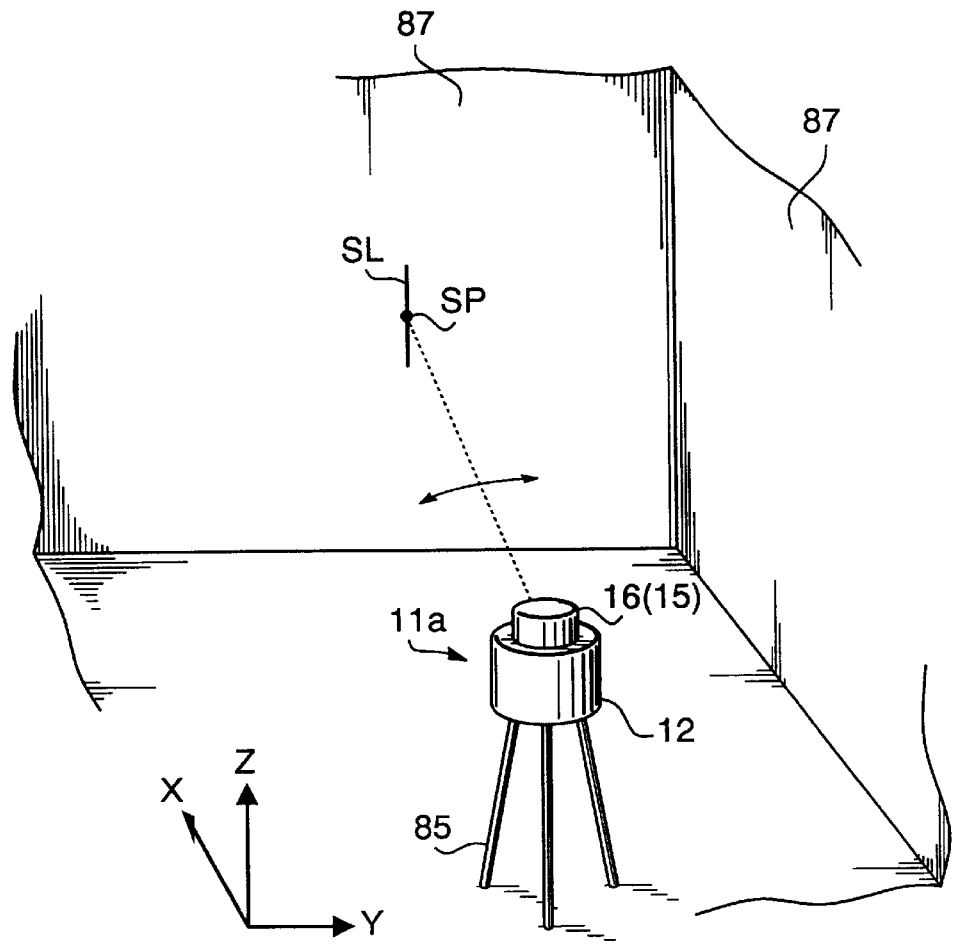
FIG. 7 is a perspective view of a laser marking device that is a variation of the first embodiment.

FIG. 7 shows a laser marking device 11a that is a variation of the first embodiment. In this variation, the direction of the light distributing lens 1 attached to the lens holding portion 33 (FIG. 5) is rotated from that of the first embodiment by 90 degrees. That is, the central flat portion 1b and the peripheral cylindrical lens portions 1a and 1c of the light distributing lens 1 of the device of FIG. 7 are divided by boundaries in the horizontal direction and the peripheral cylindrical lens portions 1a and 1c have negative power only in the vertical direction.

As a result, the static reference line SL projected on the wall 87 extends along the vertical (Z) direction. The spot SP is formed on the center of the static line SL as in the first embodiment.

Under the condition where the distance from the device 11a to the wall 87 is relatively short and brightness of extraneous light is relatively low, the static reference line SL can be seen by the naked eye. In order to mark a vertical line on the wall 87, the position of the static reference line SL is adjusted by operating the rotating position adjusting button 100, and then a user may trace the static reference line SL with a marker.

On the other hand, when a horizontal reference line is required, the selection switch 98 (FIG. 6) is turned ON to rotate the projecting unit 15. The dynamic reference line is formed as the locus of the spot SP. Under the condition of a short distance and little extraneous light, the dynamic reference line can be seen as the afterimage of the locus. If the dynamic reference line cannot be seen by the naked eye, the light position detecting device is used to detect the position of the dynamic reference line.

FIGS. 8 through 11 show variations of the light distributing lens 1 of the first embodiment. In each of these variations, a cylindrical lens portion is disposed on both sides of the cross section of the laser beam L3.

Figure 8:
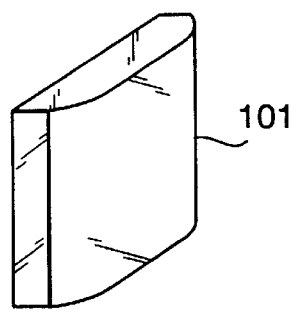
FIG. 8 is a perspective view of a light distributing lens that is a variation of the first embodiment.
Figure 9:
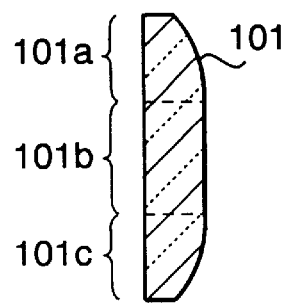
FIG. 9 is a top view of the light distributing lens of FIG. 8.

A light distributing lens 101 shown in FIGS. 8 and 9 has a central flat portion 101b having no power and peripheral cylindrical lens portions 101a and 101c having positive power in one direction. A laser beam incident in the central flat portion 101b penetrates without refraction and forms a spot on the wall 87 as in the first embodiment. The portion of the laser beam incident in the peripheral cylindrical lens portions 101a and 101c are once converged and then diverged toward the wall to form a static reference line.

The direction of the static reference line is determined by the orientation of the light distributing lens 101 when attached to the lens holding portion 33 (FIG. 5). The light distributing lens 101 is positioned such that the lens has power in the horizontal direction to form a static reference line in the horizontal direction in the same manner as FIG. 4. The light distributing lens 101 is positioned such that the lens has power in the vertical direction to form a static reference line in the vertical direction in the same manner as FIG. 7.

Figure 10:
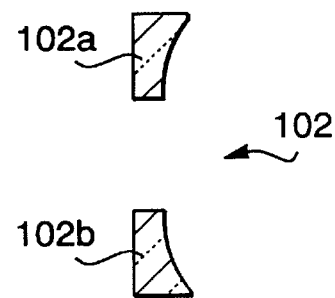
FIGS. 10 and 11 are top views of light distributing lenses that are variations of the first embodiment.

A light distributing lens 102 shown in FIG. 10 consists of a pair of cylindrical lens pieces 102a and 102b that have negative power in one direction. The distributing lens 102 is a separated lens that is equivalent to the light distributing lens 1 of the first embodiment with the central flat portion 1b removed.

Figure 11:
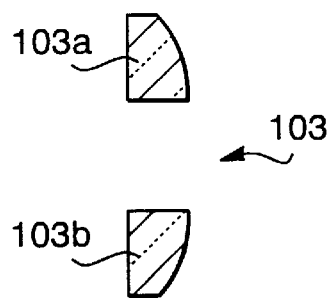

A light distributing lens 103 shown in FIG. 11 consists of a pair of cylindrical lens pieces 103a and 103b that have positive power in one direction. The distributing lens 103 is a separated lens that is equivalent to the light distributing lens 101 shown in FIGS. 8 and 9 with the central flat portion 101b removed.

The functions of the separated light distributing lenses 102 and 103 are substantially identical to the one piece lenses 1 and 101. The portion of the laser beam that is transmitted through the space between the lens pieces 102a and 102b or 103a and 103b forms the spot on the wall. The portions of the laser beam that are transmitted through the cylindrical lens pieces 102a and 102b or 103a and 103b are diverged in one direction to form the static reference line on the wall. As described above, the direction of the static reference line can be determined as the orientation of the light distributing lens is adjusted.

FIGS. 12 through 17 show still further variations of the light distributing lens 1 of the first embodiment. In each of these variations, a cylindrical lens portion is disposed on only one side of the cross section of the laser beam L3. As above, the direction of the static reference line can be determined by the orientation of the light distributing lens attached to the lens holding portion 33 (FIG. 5).

Figure 12:
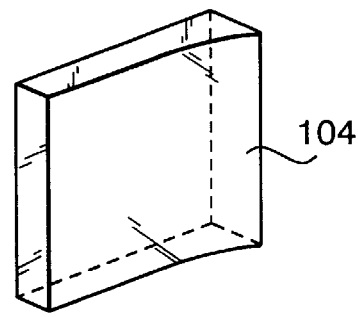
FIG. 12 is a perspective view of a light distributing lens that is a variation of the first embodiment.
Figure 13:
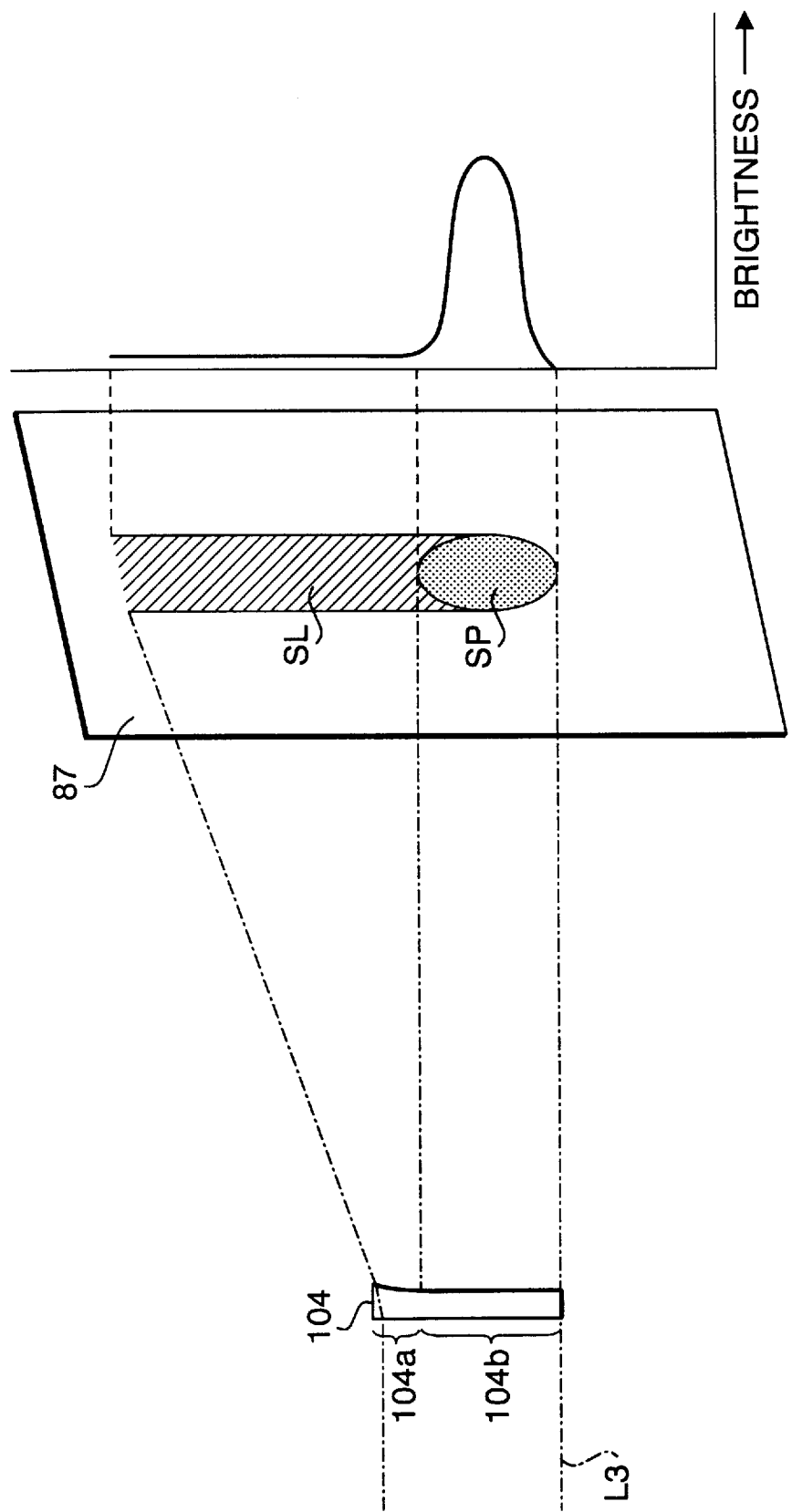
FIG. 13 illustrates a function of the light distributing lens of FIG. 12.

A light distributing lens 104 shown in FIGS. 12 and 13 consists of a relatively large flat portion 104b having no power and a peripheral cylindrical lens portion 104a having negative power located at one side of the flat portion 104b. The light distributing lens 104 is equivalent to the light distributing lens 1 of the first embodiment when one peripheral cylindrical lens portion 1c is replaced with a flat portion.

The function of the light distributing lens 104 is described with reference to FIG. 13. One portion of the laser beam L3 incident in the flat portion 104b of the light distributing lens 104 is not refracted and passes the lens 104 to form a spot SP on the wall 87. The remaining portion of the laser beam L3 incident in the cylindrical lens portion 104a is diverged to form a static reference line SL at the one side of the spot SP along one direction on the wall 87. As shown in a graph in FIG. 13, the static line SL has relatively low brightness and the spot SP has relatively high brightness.

Figure 14:
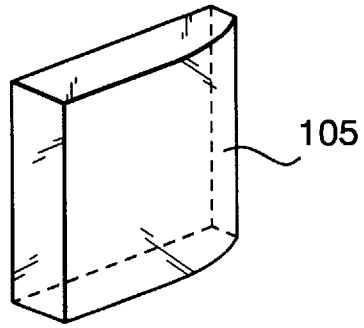
FIG. 14 is a perspective view of a light distributing lens that is a variation of the first embodiment.
Figure 15:
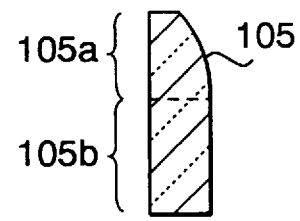
FIG. 15 is a top view of the light distributing lens of FIG. 14.

A light distributing lens 105 shown in FIGS. 14 and 15 consists of a flat portion 105b having no power and a cylindrical lens portion 105a having positive power. This lens 105 is equivalent to the light distributing lens 101 shown in FIG. 9 when one peripheral cylindrical lens portion 101c is replaced with a flat portion. The projected marking pattern is a spot having high brightness and the static reference line having low brightness at one side of the spot.

Figure 16:
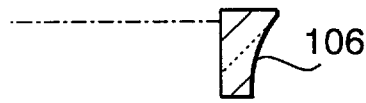
FIGS. 16 and 17 are top views of light distributing lenses that are variations of the first embodiment.
Figure 16:
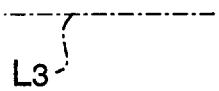
Figure 17:
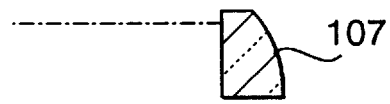
Figure 17:
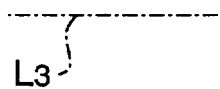

Light distributing lenses 106 and 107 shown in FIGS. 16 and 17 consist of a cylindrical lens portion that covers half the cross section of the laser beam L3. The use of half of the cross section is given only as an example, the predetermined amount of coverage can be varied depending on the desired brightness of the static reference line. The lens 106 has negative power and the lens 107 has positive power. The function of these lenses are substantially identical with that of the lenses 104 and 105 respectively. The portion of the laser beam L3 that is not incident in the lens 106 or 107 forms a spot, and the remaining portion of the laser beam L3 that is incident in the lens 106 or 107 forms a static reference line at one side of the spot.

All of the light distributing lens of the above mentioned variations shown in FIGS. 8 through 17 involve cylindrical lens portions for which generatrices are parallel to the boundaries between the lens portion and the other portion (flat portion or space).

The variations shown in FIGS. 18 through 23 have boundaries between a cylindrical lens portion and another portion (in these examples a space, but which could also be a flat portion) that are perpendicular to the generatrices of the cylindrical lens portions. As above, in these variations, the direction of the static reference line can be determined by the orientation of the light distributing lens.

Figure 18:
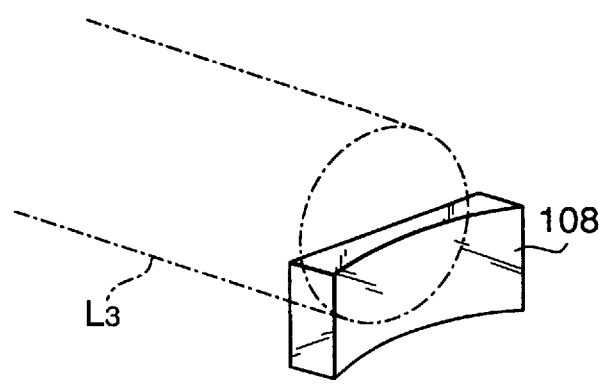
FIG. 18 is a perspective view of a light distributing lens that is a variation of the first embodiment.
Figure 19:
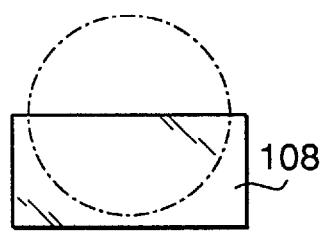
FIG. 19 is a front view of the light distributing lens of FIG. 18.
Figure 20:
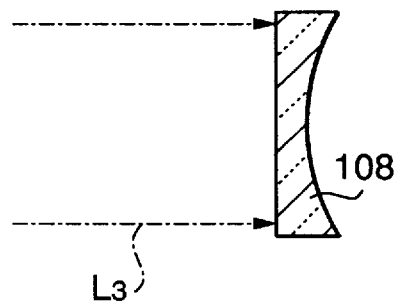
FIG. 20 is a top view of the light distributing lens of FIG. 18.

As shown in FIGS. 18 through 20, a light distributing lens 108 is formed as a negative cylindrical lens and covers half the cross section of the laser beam L3. The use of half of the cross section is given only as an example, the predetermined amount of coverage can be varied depending on the desired brightness of the static reference line. FIG. 18 is a perspective view of the light distributing lens 108, FIG. 19 is a front view and FIG. 20 is a top view. The portion of the laser beam L3 that is not incident in the lens 108 forms a spot on the wall and the remaining portion incident in the lens 108 is diverged and forms a static reference line on the wall at the sides of the spot.

Figure 21:
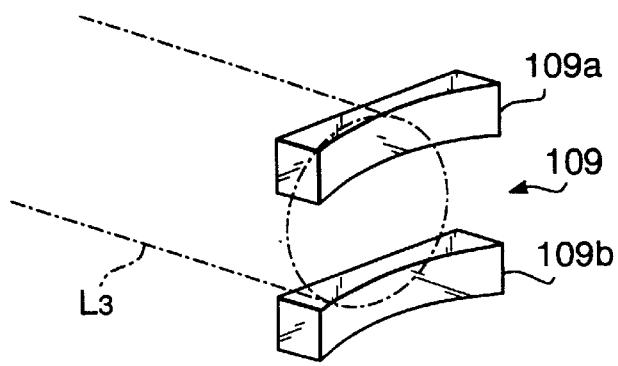
FIG. 21 is a perspective view of a light distributing lens that is a variation of the first embodiment.
Figure 22:
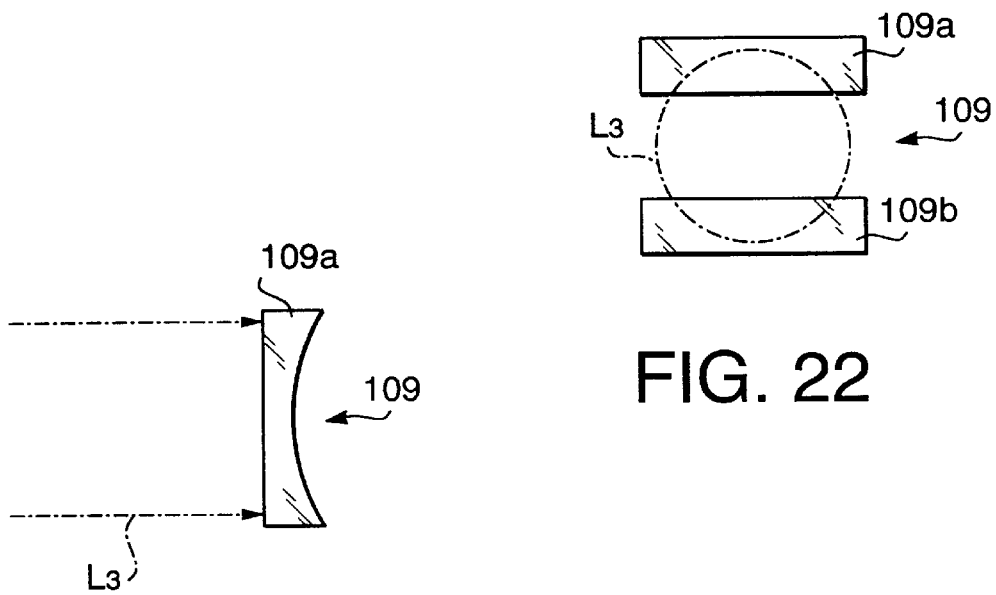
FIG. 22 is a front view of the light distributing lens of FIG. 21.
Figure 23:
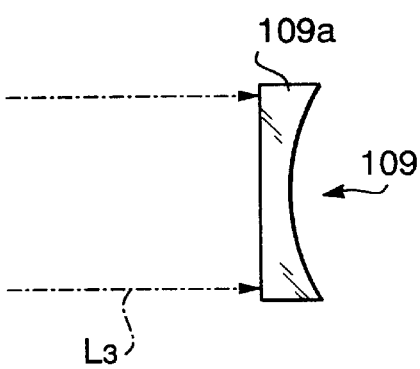
FIG. 23 is a top view of the light distributing lens of FIG. 21.

As shown in FIGS. 21 through 23, a light distributing lens 109 consists of a pair of negative cylindrical lenses 109a and 109b that are spaced in a direction of a generatrix of each lens. FIG. 21 is a perspective view of the light distributing lens 109, FIG. 22 is a front view and FIG. 23 is a top view. The laser beam that is transmitted through the space between the lenses 109a and 109b forms a spot on the wall. The laser beams that are transmitted through the cylindrical lens 109a and 109b are diverged in one direction and, in a focused condition, form a single static reference line on the wall at the sides of the spot.

Figure 24:
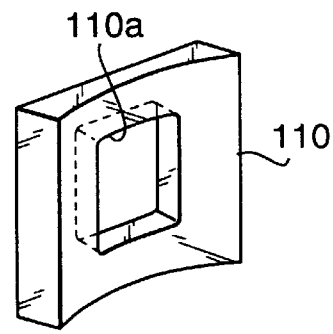
FIGS. 24 through 27 are perspective views of light distributing lenses that are variations of the first embodiment.
Figure 25:
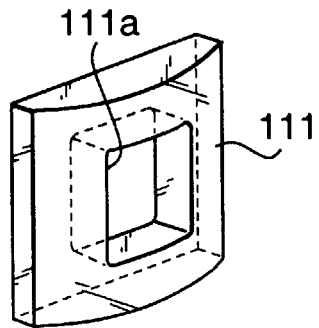

FIGS. 24 and 25 show still further variations of the first embodiment. Light distributing lenses in these variations are formed to include holes at the center of the lenses through which the light is transmitted.

A light distributing lens 110 of FIG. 24 is a negative cylindrical lens with a rectangular hole 110a at the center of the lens 110. On the other hand, a light distributing lens 111 of FIG. 25 is a positive cylindrical lens with a rectangular hole 111a at the center of the lens 111.

In these light distributing lenses 110 and 111, a central portion of the laser beam L3 penetrates the hole 110a or 111a to form a spot on the wall. A peripheral portion of the laser beam L3 that is incident to the lens portion of the light distributing lens 110 or 111 forms a static reference line on the wall at both sides of the spot.

The cylindrical lenses of the first embodiment and the above mentioned variations ate formed as homogeneous in internal refractive index. These lenses can be replaced with gradient index (GRIN) lenses whose material refractive index varies continuously to produce a similar effect as a cylindrical lens.

Figure 26:
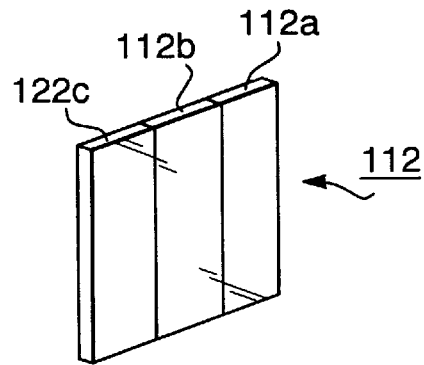

A light distributing lens 112 shown in FIG. 26 includes a central portion 112b that is homogeneous in refractive index and peripheral GRIN lens portions 112a and 112c located at both sides of the central portion 112b. The refractive index of each of the GRIN lens portion 112a and 112c increases as the distance from the central portion 112b increases. Each of the GRIN lens portions functions similar to a negative cylindrical lens.

The function of the light distributing lens 112 is identical with chat of the first embodiment. That is, the portion of the laser beam L3 that is incident in the central portion 112b forms a spot on a wall, and the other portion of the laser beam L3 that are incident in the GRIN lens portions 112a and 112c are diverged and form a static reference line on the wall at both sides of the spot.

Similar to the variations described above, the GRIN lens portions 112a and 112c may function similar to positive cylindrical lenses. In such a case, the refractive index of each of GRIN lens portions 112a and 112c decreases as the distance from the central portion 112b increases.

Furthermore, one of the GRIN lens portions may be replaced with a portion having no power or the portions having no power may be removed.

In the variations of FIGS. 24 through 26, the direction of the static reference line can be determined by the orientation of the light distributing lens.

FIGS. 27 through 32 show variations in which two static reference lines are formed on a wall. The static reference lines cross perpendicularly.

Figure 27:
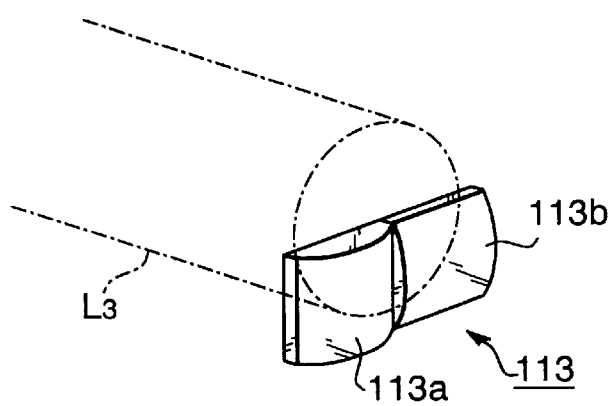
Figure 28:
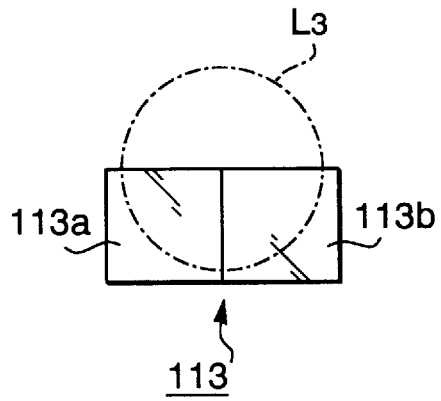
FIG. 28 is a front view of the light distributing lens of FIG. 27.
Figure 29:
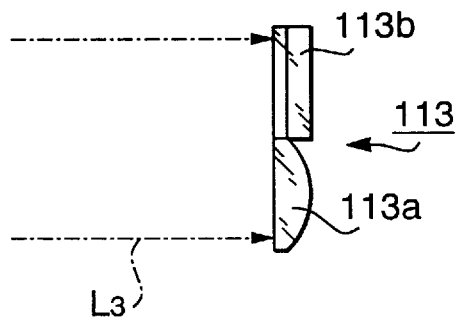
FIG. 29 is a top view of the light distributing lens of FIG. 27.
Figure 30:
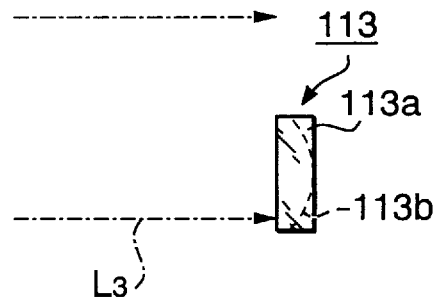
FIG. 30 is a side view of the light distributing lens of FIG. 27.

A light distributing lens 113 shown in FIGS. 27 through 30 consists of first and second cylindrical lenses 113a and 113b, and the lens 113 covers half of the laser beam L3 The generatrices of the cylindrical lenses 113a and 113b are perpendicular to each other. That is, the first cylindrical lens 113a has a positive power in the horizontal direction and the second cylindrical lens 113b has a positive power in the vertical direction. FIG. 27 is a perspective view of the light distributing lens 113, FIG. 28 is a front view, FIG. 29 is a top view and FIG. 30 is a side view.

One half portion of the laser beam L3 is not incident on the light distributing lens 113 and forms a spot on the wall 87. The quarter portion of the remaining half of the laser beam L3 that is incident in the first cylindrical lens 113a is once converged and then diverged to form a first static reference line on the wall along the horizontal direction at both sides of the spot. The remaining quarter portion of the laser beam L3 that is incident in the cylindrical lens 113b is once converged and then diverged to form a second static reference line along the vertical direction at both sides of the spot. The first static reference line is perpendicular to the second static reference line.

Figure 31:
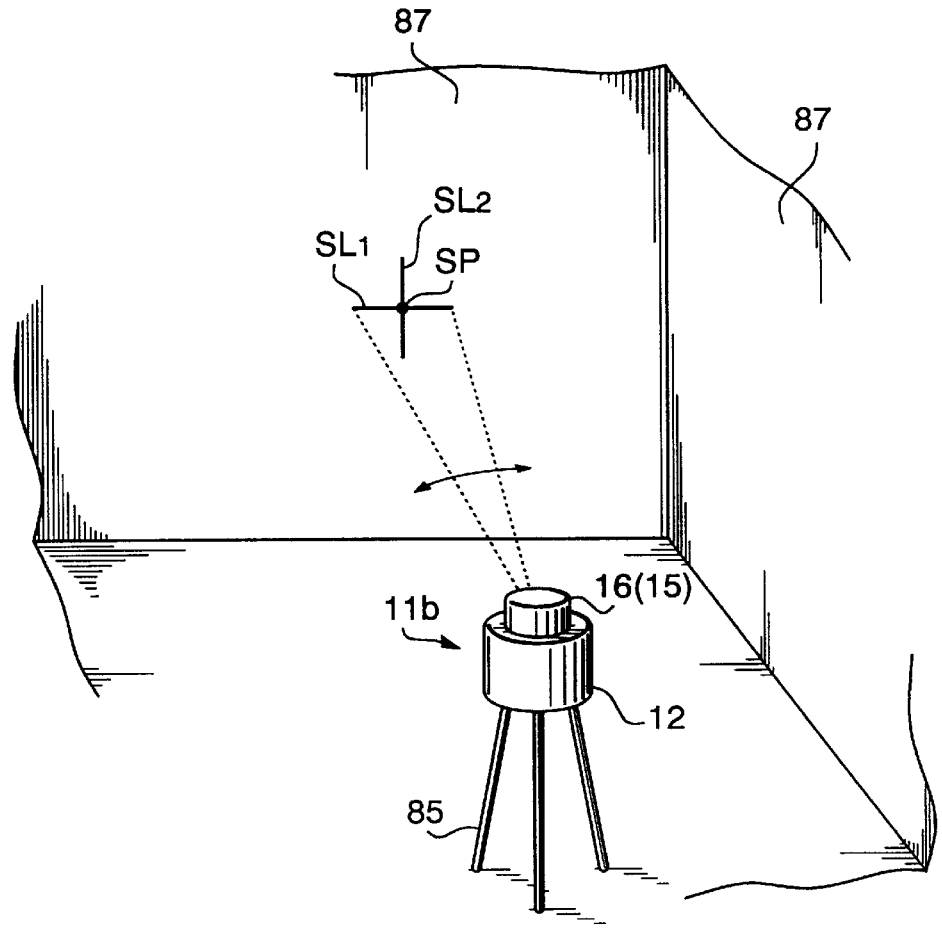
FIG. 31 is a perspective view of the laser marking device that is a variation of the first embodiment.

FIG. 31 shows the laser marking device 11b in which the light distributing lens 113 is attached to the lens holding portion 33 (FIG. 5). The first static reference line SL1 projected on the wall 87 extends along the horizontal direction and the second static reference line SL2 extends along the vertical direction. The spot SP is formed at the crossing point of the two static reference lines.

Under the condition where the distance from the device 11b to the wall 87 is relatively short and the brightness of extraneous light is relatively low, the static reference lines SL1 and SL2 can be seen by the naked eye. In order to mark a vertical line or a short horizontal line on the wall 87, the position of the static reference lines SL1 and SL2 are adjusted using the rotating position adjusting button 100, and then a user may trace one or both of the static reference lines SL1 or SL2 using a marker.

On the other hand, when a full arc horizontal reference line is required for marking, the selection switch 98 (FIG. 6) is turned ON to rotate the projecting unit 15. The dynamic reference line is formed as the locus of the spot SP. Under the condition of a short distance and little extraneous light, the dynamic reference line can be seen as the afterimage of the locus. If the dynamic reference line cannot be seen by the naked eye, the light position detecting device can be used to detect the position of the dynamic reference line.

Figure 32:
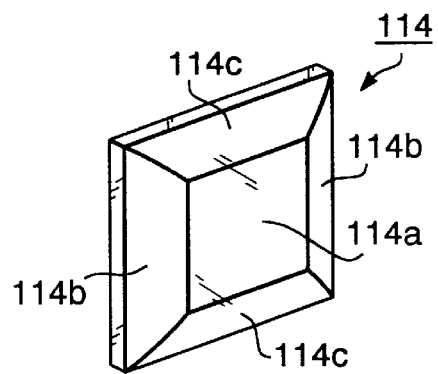
FIG. 32 is a perspective view of a light distributing lens that is a variation of the first embodiment.

A light distributing lens 114 shown in FIG. 32 is formed to cover the entire area of the laser beam L3. The lens 114 includes a central flat portion 114a having no power, a pair of first cylindrical lens portions 114b having positive power in the horizontal direction and a pair of second cylindrical lens portions 114c having positive power in the vertical direction The projected pattern of the light distributing lens 114 is identical with the variation described using FIGS. 27 through 31.

The portion of the laser beam L3 incident in the central flat portion 114a is not refracted and passes the lens 114 to form a spot on a wall. The portion of the laser beam L3 incident in the first cylindrical lens portions 114b is once converged and then diverged to form a first static reference line on the wall along the horizontal direction at both sides of the spot. The laser beam incident in the second cylindrical lens portion 114c is once converged and then diverged to form a second static reference line along the vertical direction at both sides of the spot.

In the variation of FIG. 32, the cylindrical lens portions 114b and 114c may also be formed to have negative power and the cylindrical lens portions may be positioned at only one side.

FIGS. 33 through 36 show second and third embodiments and their variations. In these embodiments, a cylindrical lens is used to form a static reference line similar to the first embodiment and variations, however, in these embodiments the optical paths are completely separated. The cylindrical lens to form a static reference line is located in at least one of the separated optical paths. Additionally, all of the optical elements are arranged in a projecting unit that is rotatable. A direction parallel to the rotating axis is defined as the vertical direction and a direction perpendicular to the vertical direction is defined as the horizontal direction.

Figure 33:
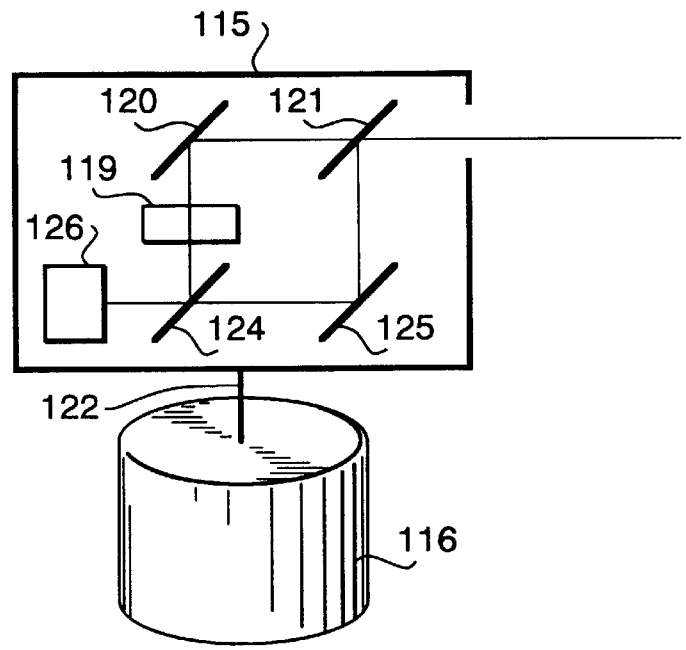
FIG. 33 is an outline drawing of a laser marking device of a second embodiment.

FIG. 33 shows the second embodiment. A projecting unit 115 in which all of the optical elements are arranged is supported by a driving shaft 122 of a rotating motor 116. A laser beam emitted from a laser source 126 is divided by a first beam splitter 124. In order to make the laser beam parallel and circular in section, a collimator lens and a cylindrical lens are applied similar to as shown in FIG. 1 (not shown).

The transmitted component through the first beam splitter 124 is reflected by the mirror 125 and directed toward a second beam splitter 121. The laser beam reflected by the mirror 125 and the second beam splitter 121 is projected to form a spot on a wall.

The reflected component by the first beam splitter 124 is transmitted through a cylindrical lens 119 and reflected by a mirror 120 directed toward a second beam splitter 121. The cylindrical lens 119 has a positive power in one direction (in this example, perpendicular to the page containing the figure). And thus, the portion of the laser beam that exits from the cylindrical lens 119 and penetrates the second beam splitter 121 is once converged and then diverged in the horizontal direction to form a static reference line on the wall along the horizontal direction at both sides of the spot.

Under the condition where a distance from the device to the wall is relatively short and brightness of extraneous light is relatively low, the static reference line can be seen by the naked eye. In order to mark a short horizontal line on the wall, the position of the static reference line is adjusted by driving the rotating motor 116 stepwise, and then a user may, trace the static reference line using a marker or the like.

On the other hand, when a larger or full arc horizontal reference line is required, the rotating motor 116 is continuously driven to rotate the projecting unit 115 at a constant speed. The dynamic reference line is formed as the locus of the spot. Under the condition of a short distance and little extraneous light, the dynamic reference line can be seen as the afterimage of the locus. If the dynamic reference line cannot be seen by the naked eye, the light position detecting device can be used to detect the position of the dynamic reference line.

Figure 34:
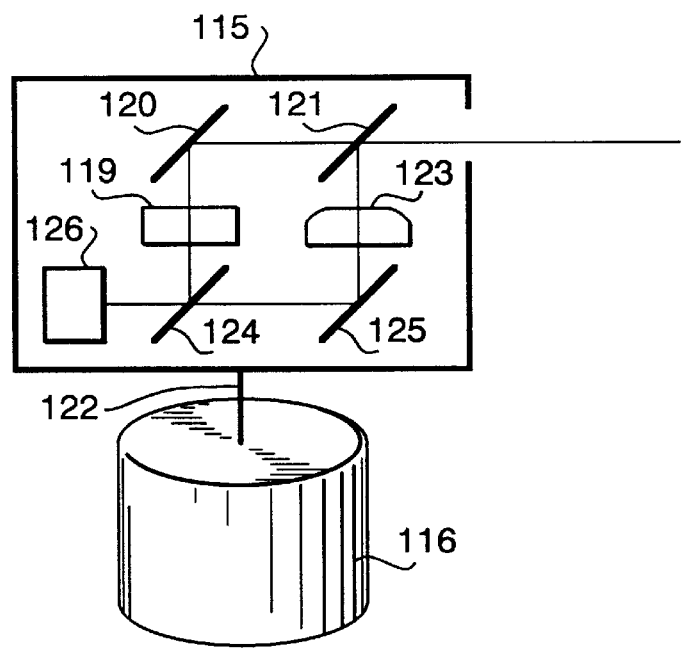
FIG. 34 is an outline drawing of a laser marking device that is a variation of the second embodiment.

FIG. 34 shows a variation of the second embodiment. In this variation, a light distributing lens 123 is disposed between the mirror 125 and the second beam splitter 121. The other elements and their arrangement remaining the same. The light distributing lens 123 has a central flat portion having no power and peripheral cylindrical lens portions having positive power similar to the lens 101 shown in FIGS. 8 and 9. The generatrices of the cylindrical lens portions of the light distributing lens 123 are perpendicular to the generatrix of the cylindrical lens 119.

The laser beam transmitted through the cylindrical lens 119 forms a horizontal static reference line on a wall in the same manner as the second embodiment. The portion of the laser beam incident in the central flat portion of the light distributing lens 123 and reflected by the second beam splitter 121 forms a spot on the wall. The portion of the laser beam incident in the peripheral cylindrical lens portions of the light distributing lens 123 and reflected by the second beam splitter 121 forms a vertical static reference line.

Consequently, both a horizontal static reference line and a vertical static reference line are projected on the wall and a spot is formed at the crossing point of the two static reference lines.

Under the condition where a distance from the device to the wall is relatively short and brightness of extraneous light is relatively low, the static reference lines can be seen by the naked eye. In order to mark a vertical line or a short horizontal line on the wall, the position of the static reference lines are adjusted by driving the rotating motor 116 stepwise and then a user may trace one of the static reference lines using a marker or the like.

On the other hand, when a larger or full arc horizontal reference line is required, the rotating motor 116 is continuously driven to rotate the projecting unit 115 at a constant speed. The dynamic reference line is formed as the locus of the spot. Under the condition of a short distance and little extraneous light, the dynamic reference line can be seen as the afterimage of the locus. If the dynamic reference line cannot be seen by the naked eye, the light position detecting device is used to detect the position of the dynamic reference line.

Figure 35:
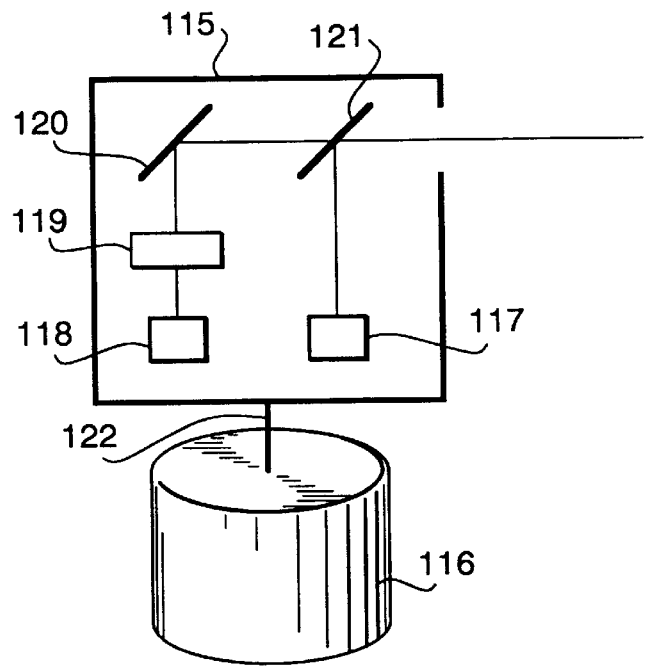
FIG. 35 is an outline drawing of a laser marking device of a third embodiment.

FIG. 35 shows the third embodiment. In this embodiment, two laser sources 117 and 118 are used. A general construction similar to the second embodiment is used. A first optical system including the first laser source 117 comprises a collimator lens, a cylindrical lens and a beam expander that are applied similar to as shown in FIG. 1 (nor shown). A second optical system including the second laser source 118 and a cylindrical lens 119 also comprises a collimator lens, a cylindrical lens and a beam expander that are applied similar to as shown in FIG. 1 (not shown).

The laser beam emitted from the first laser source 117 is reflected by the beam splitter 121 to form a spot on the wall. The laser beam emitted from the second laser source 118 is transmitted through the cylindrical lens 119 and reflected by the mirror 120 directed toward the beam splitter 121. The cylindrical lens 119 has a positive power in one direction (in this example, perpendicular to the page of the figure). Thus, the laser beam that exits from the cylindrical lens 119 and penetrates the beam splitter 121 forms a static reference line on the wall along the horizontal direction at both sides of the spot, The operation of the device of the third embodiment is identical with that of the second embodiment.

Figure 36:
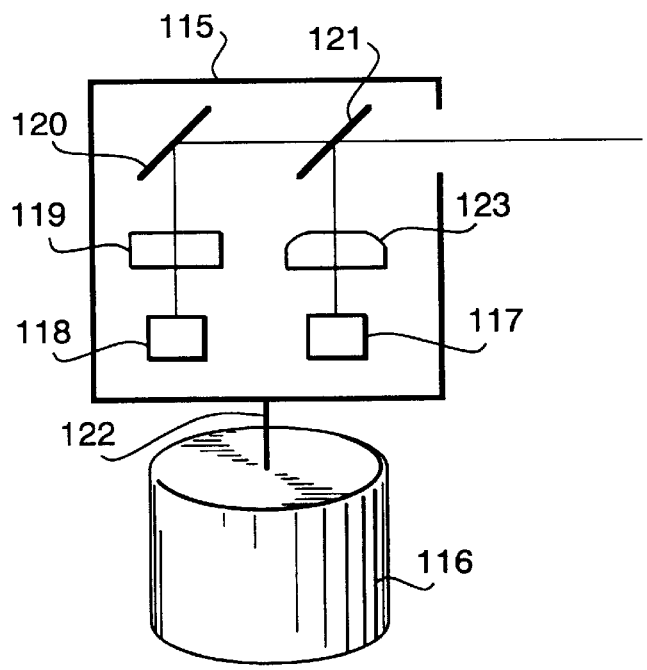
FIG. 36 is an outline drawing of a laser marking device that is a variation of the third embodiment.

FIG. 36 shows a variation of the third embodiment and is similar to FIG. 34. In this variation, the first optical system comprises the light distributing lens 123 that is disposed between the first laser source 117 and the beam splitter 121. The light distributing lens 123 has a central flat portion having no power and peripheral cylindrical lens portions having positive power. The generatrices of the cylindrical lens portions of the light distributing lens 123 are perpendicular to the generatrix of the cylindrical lens 119.

The laser beam transmitted through the cylindrical lens 119 forms a horizontal static reference line on a wall. The portion of the laser beam incident in the central flat portion of the light distributing lens 123 and reflected by the second beam splitter 121 forms a spot on the wall. The portion of the laser beam incident in the peripheral cylindrical lens portions of the light distributing lens 123 and reflected by the second beam splitter 121 forms a vertical static reference line.

Consequently, both a horizontal static reference line and a vertical static reference line are projected on the wall and a spot is formed at the crossing point of the two static reference lines. The operation of the device of this variation is identical with that of the variation shown in FIG. 34.

Figure 37:
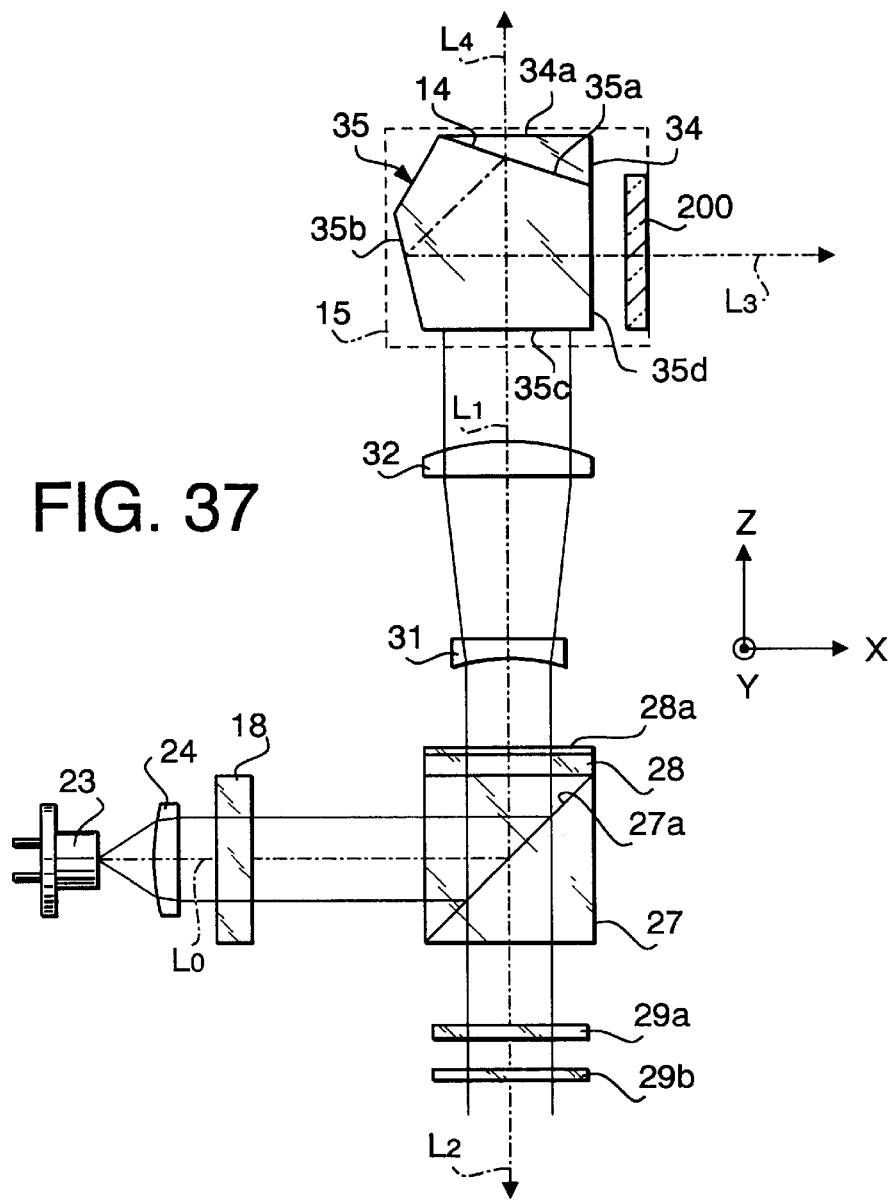
FIG. 37 shows an optical system of a laser marking device according to a fourth embodiment.

FIGS. 37 through 40 show a fourth embodiment of the laser marking device. As shown in FIG. 37, in this embodiment, a light diffracting element 200 is disposed as a light distributing element in place of the light distributing lens 1 of the first embodiment. The other elements and their arrangement in the fourth embodiment is identical with that of the first embodiment.

Figure 38:
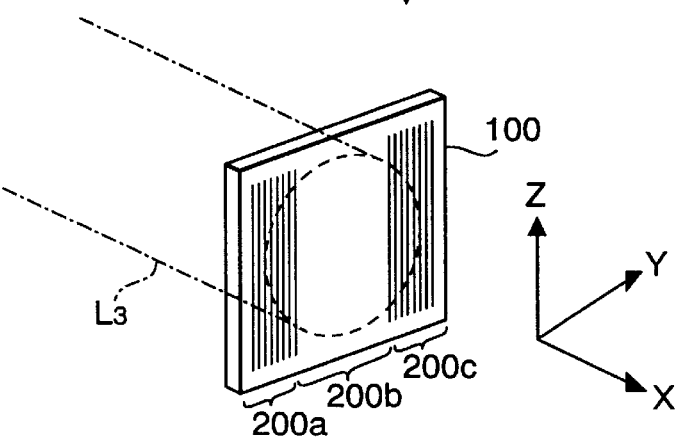
FIG. 38 is a perspective view of a light diffracting element of the fourth embodiment.
Figure 39:
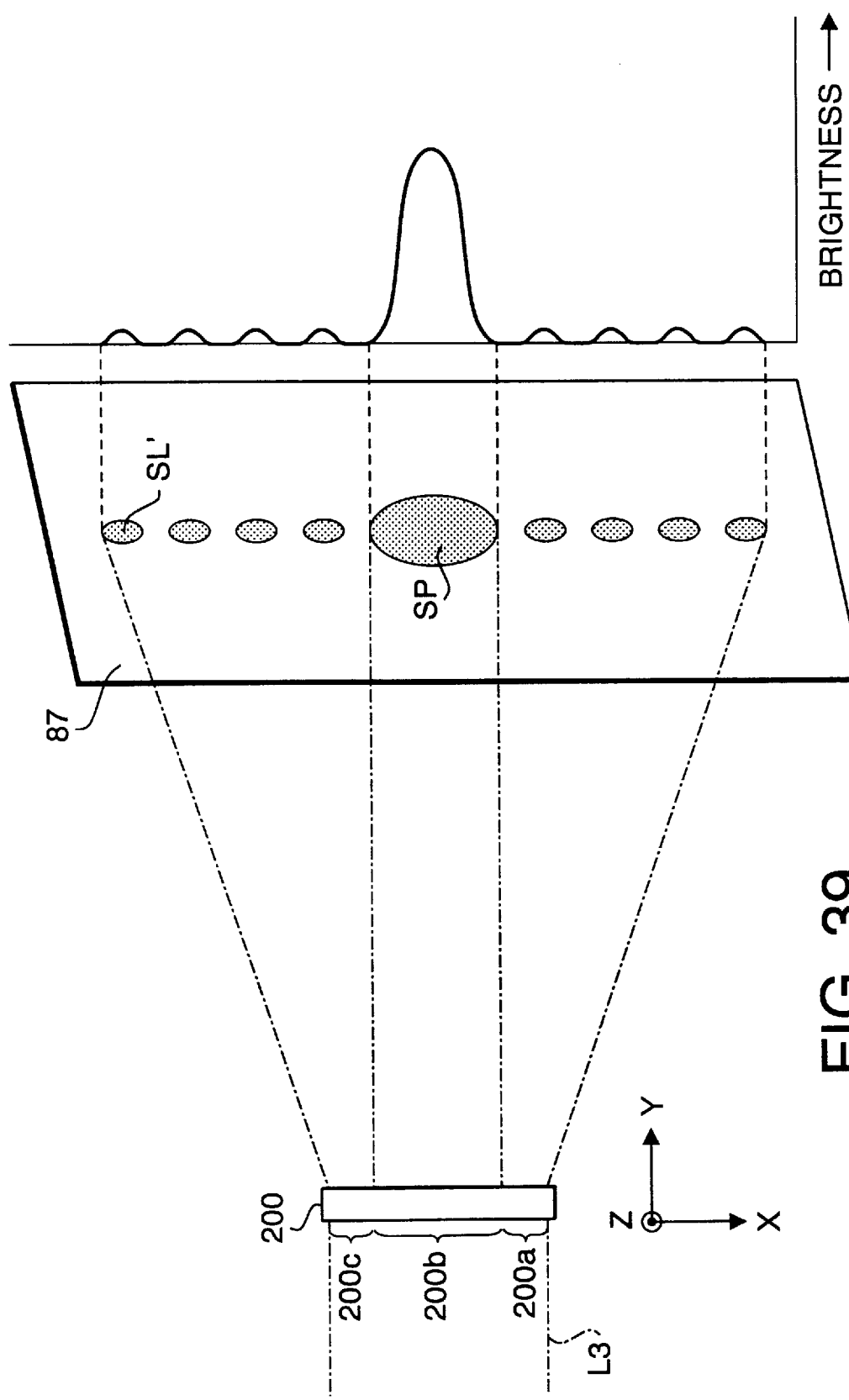
FIG. 39 illustrates a function of the light diffracting element of the fourth embodiment.

As shown in FIGS. 38 and 39, the light diffracting element 200 is a one piece element having a central flat portion 200b and peripheral grating portions 200a and 200c that are located at sides of the flat portion 200b. The boundaries separating the portions 200a, 200b and 200c are parallel to the vertical (Z) direction. The grating portions 200a and 200c have linear grating patterns in which the direction of lines is parallel to the vertical direction. The grating portions 200a and 200c have diffractive power so that the laser beams are diffracted and spread in the horizontal (Y) direction.

As shown in FIG. 39, a central portion of the laser beam L3 incident in the central flat portion 200b of the light diffracting element 200 is not diffracted and passes the element 200 to form a spot SP on the wall 87. Peripheral portions of the laser beam L3 incident in the grating portions 200a and 200c are diffracted and the diffracted beams are aligned on a line to form a static reference dotted line SL' at both sides of the spot SP along the Y direction on the wall 87. As shown in a graph in FIG. 39, the static reference dotted line SL' has relatively low brightness and the spot SP has relatively high brightness.

Figure 40:
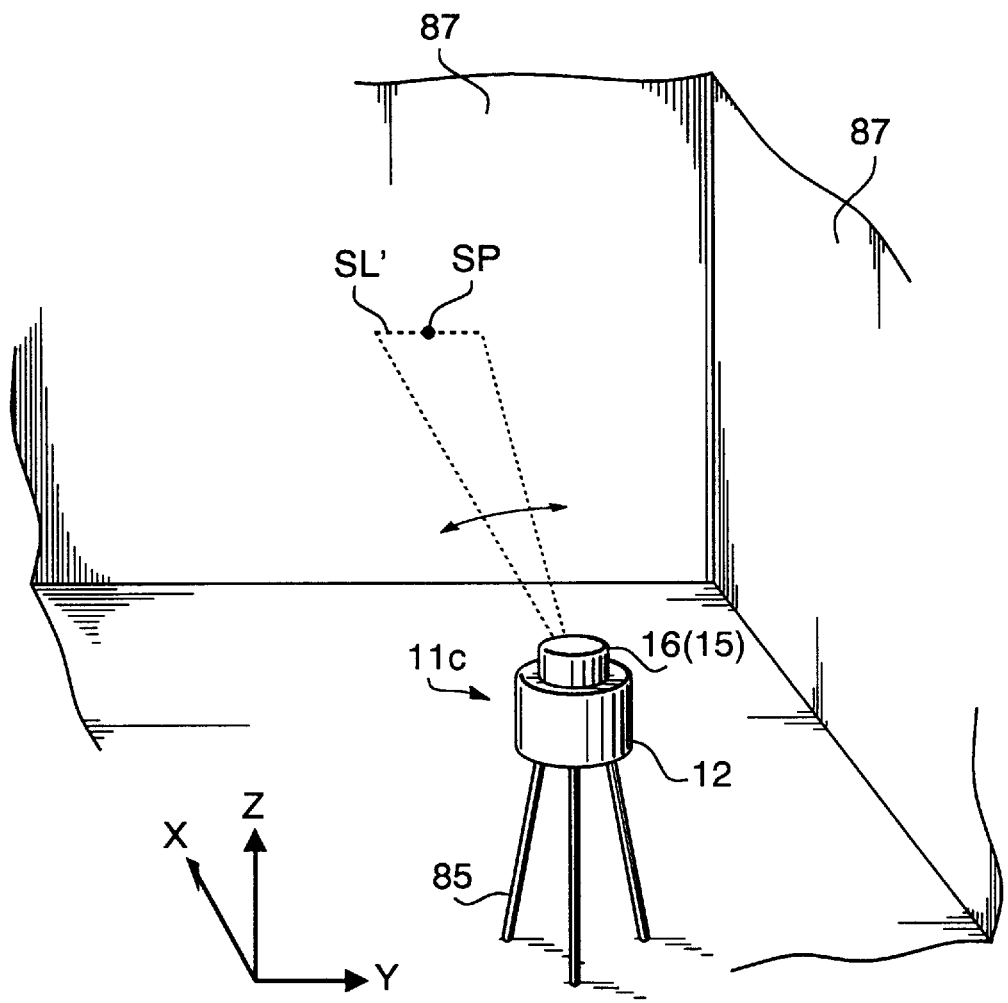
FIG. 40 is a perspective view of the laser marking device of the fourth embodiment.

As shown in FIG. 40, in the laser marking device 11c of the fourth embodiment the projected laser beam passes the transparent window of the upper housing 16 and forms a marking pattern on the wall 87. When the projecting unit 15 is not rotating, the marking pattern consists of the static dotted line SL' and the spot SP. When the projecting unit 15 is rotating, the marking pattern is formed as a dynamic reference line that is a locus of the spot SP as the exit direction of the laser beam changes due to the rotation of the projecting unit 15.

When the marking area is small and the static reference dotted line SL' can be seen by the naked eye, the marking line can be traced by the user using a marker or the like to mark the line in ink. If the static reference dotted line SL' is not at the required marking position, a user pushes the rotating position adjusting button 100 (FIG. 6) until the static reference dotted line SL' is formed at the required marking position.

If the static reference dotted line SL' cannot be seen by the naked eye due to the distance or extraneous light, the selection switch 98 (FIG. 6) is turned ON to form a dynamic reference line as an afterimage of the locus of the spot SP. Although the brightness of the dynamic reference line is lower than that of the static reference dotted line SL', the dynamic reference line can be detected by the light position detecting device (as described above). A user detects the dynamic reference line by using the light position detecting device and then traces using a marker.

Also, to form a larger or full arc marking line, the selection switch 98 (FIG. 6) is turned ON to form the dynamic reference line. As above, the dynamic reference line can be seen by the naked eye when the distance from the device 11c to the wall 87 is relatively short and the brightness of extraneous light is relatively low. Also as above, if the dynamic reference line cannot be seen by the naked eye, it can be detected by the light position detecting device.

In the, laser marking device 11c of the present embodiment, since the spot SP is formed by one portion of the laser beam that is not diffracted by the grating portions, the dynamic reference line formed by the spot can be designed to have an intensity that is higher than a predetermined threshold level of the light position detecting device.

Additionally, the angle of sector formed by the diffracted laser beam of the laser marking device 11c is smaller than that of the conventional line projection type marking device since the projecting unit 15 can rotate to move the static reference dotted line SL' easily. Furthermore, since the brightness of the static reference dotted line SL' is higher than that of the dynamic reference line formed by the spot SP, the distance at which a static reference dotted line SL' that is visible to the naked eye is formed is longer than that of the dynamic reference line.

FIGS. 41 through 53 show variations of the fourth embodiment. In the fourth embodiment, the static reference dotted line SL' is formed in the horizontal direction that coincides with the dynamic reference line. Additionally, the light diffracting element 200 has the central flat portion 200b having no power and the peripheral grating portions 200a and 200c having diffractive power. Further, the light diffracting element 200 is one piece element that covers the entire section of the laser beam L3.

However, in a variation, the static reference dotted line SL' may be formed to extend along the vertical direction such that it is perpendicular to the dynamic reference line or two static reference lines may be formed as crossed lines along the horizontal and vertical directions. Further, the peripheral grating portion may be positioned at only one side of the central flat portion. Additionally, the central flat portion can be replaced such that a space is defined in which no material is positioned.

In the variations, only the light diffracting element is different, the other features including the arrangement of the optical elements, the mechanical construction and the controlling system are identical with the fourth embodiment.

FIGS. 41 through 45 show variations of the light diffracting element where the static reference dotted line extends in a horizontal direction, i.e., the direction of the grating line is parallel to the vertical direction.

Figure 41:
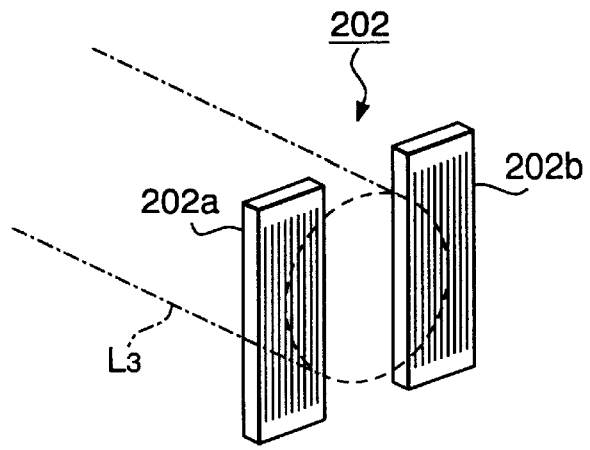
FIGS. 41 through 46 are perspective views of light diffracting elements that are variations of the fourth embodiment.

A light diffracting element 202 shown in FIG. 41 consists of a pair of grating plates 202a and 202b that have diffractive power in the horizontal direction. The diffracting element 202 is a separated element that is equivalent to the light diffracting element 200 of the fourth embodiment when the central flat portion 200b is removed from the element 200.

The function of the separated element 202 is substantially identical to the one piece element 200. The portion of the laser beam that is transmitted through the space between the grating plates 202a and 202b forms a spot on the wall. The portions of the laser beam that are transmitted through the grating plates 202a and 202b is diffracted in the horizontal direction to form the static reference dotted line in the horizontal direction on the wall.

Figure 42:
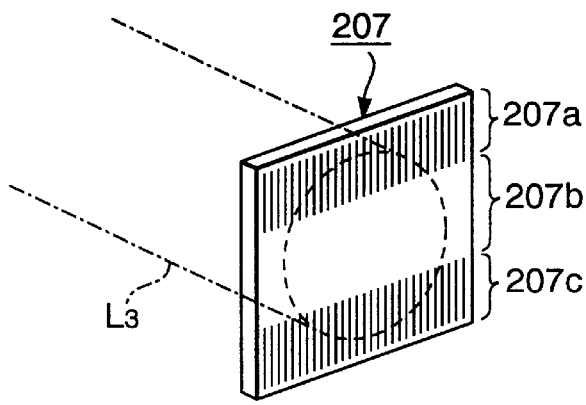

A light diffracting element 207 shown in FIG. 42 is a one piece element having a central flat portion 207b and peripheral grating portions 207a and 207c that are located at sides of the flat portion 207b. These portions 207a, 207b and 207c have boundaries that are parallel to the horizontal direction. The portion of the laser beam incident in the central flat portion 207a forms a spot on a wall. The portions of the laser beam incident in the grating portions 207a and 207c are diffracted in the horizontal direction and, in a focused state, form a single static reference dotted line on the wall at the sides of the spot (similar to the fourth embodiment).

Figure 43:
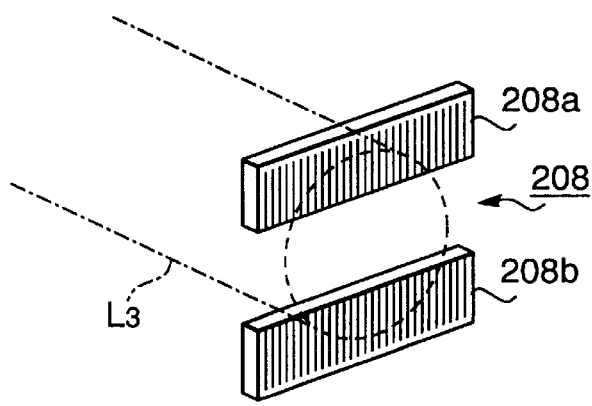

A light diffracting element 208 shown in FIG. 43 consists of a pair of grating plates 208a and 208b that have diffractive power in the horizontal direction. The diffracting element 208 is a separated element that is equivalent to the light diffracting element 207 shown in FIG. 42 when the central flat portion 207b is removed from the element 207.

The function of the separated element 208 is substantially identical to the one piece element 207. The portion of the laser beam that is transmitted through the space between the grating plates 208a and 202b forms a spot on the wall. The portions of the laser beam that are transmitted through the grating plates 208a and 208b are diffracted in the horizontal direction, in a focused state, form a single static reference dotted line on the wall.

Figure 44:
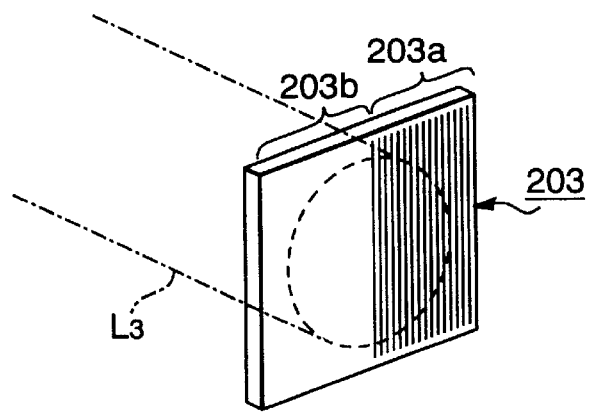
Figure 45:
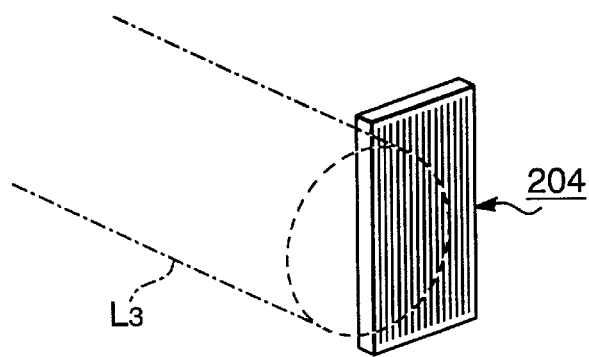

FIGS. 44 and 45 show further variations of the light diffracting element of the fourth embodiment. In each of these variations, a grating portion is disposed on only one side of the cross section of the laser beam. The direction of the static reference dotted line is also parallel to the horizontal direction.

A light diffracting element 203 shown in FIG. 44 consists of a flat portion 203b having no power and a peripheral grating portion 203a having diffractive power located at one side of the flat portion 203b. The flat portion 203b covers half of the cross section of the laser beam L3 and the grating portion 203a covers the remaining portion of the cross section of the laser beam L3. The use of half of the cross section is given only as an example, the predetermined amount of coverage can be varied depending on the desired brightness of the static reference dotted line.

The portion of the laser beam L3 incident in the flat portion 203b of the light diffracting element 203 is not diffracted and passes through the element 203 to form a spot on a wall. The remaining portion of the laser beam L3 incident in the grating portion 203a is diffracted to form a static reference dotted line at both sides of the spot in a horizontal direction on the wall.

A light diffracting element 204 shown in FIG. 45 is a grating plate that covers half of the cross section of the laser beam L3. The use of half of the cross section is given only as an example, the predetermined amount of coverage can be varied depending on the desired brightness of the static reference dotted line. The portion of the laser beam L3 that is not incident in the light diffracting element 203 forms a spot on the wall. The remaining portion of the laser beam L3 incident in the light diffracting element 204 is diffracted to form a static reference dotted line at both sides of the spot in a horizontal direction on the wall.

FIGS. 46 through 51 show variations of the light diffracting element where the static reference dotted line extends in a vertical direction, i.e., in these variations the direction of the grating lines is parallel to the horizontal direction.

Figure 46:
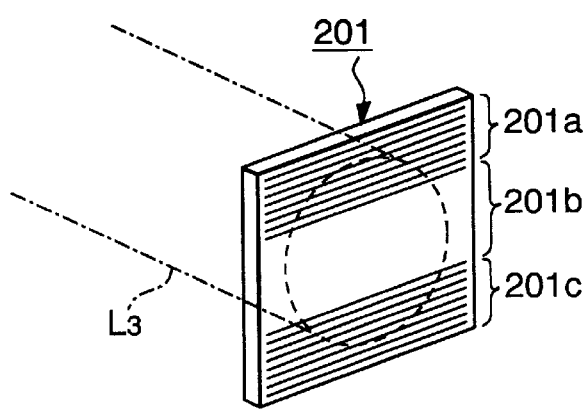

As shown in FIG. 46, a light diffracting element 201 is a one piece element having a central flat portion 201b and peripheral grating portions 201a and 201c that are located at both sides of the flat portion 201b. These portions 201a, 201b and 201c have boundaries that are parallel to the horizontal direction. The grating portions 201a and 201c have linear grating patterns where the direction of lines are parallel to the horizontal direction The grating portions 200a and 200c have diffractive power so that the laser beam is diffracted and spread in the vertical direction.

The central portion of the laser beam L3 incident in the central flat portion 201b of the light diffracting element 201 is not diffracted and passes the element 201 to form a spot on a wall. The peripheral portions of the laser beam L3 incident in the grating portions 201a and 201c are diffracted by the element 201 and the diffracted beams are aligned on a line to form a static reference dotted line at the sides of the spot in a vertical direction on the wall.

Figure 47:
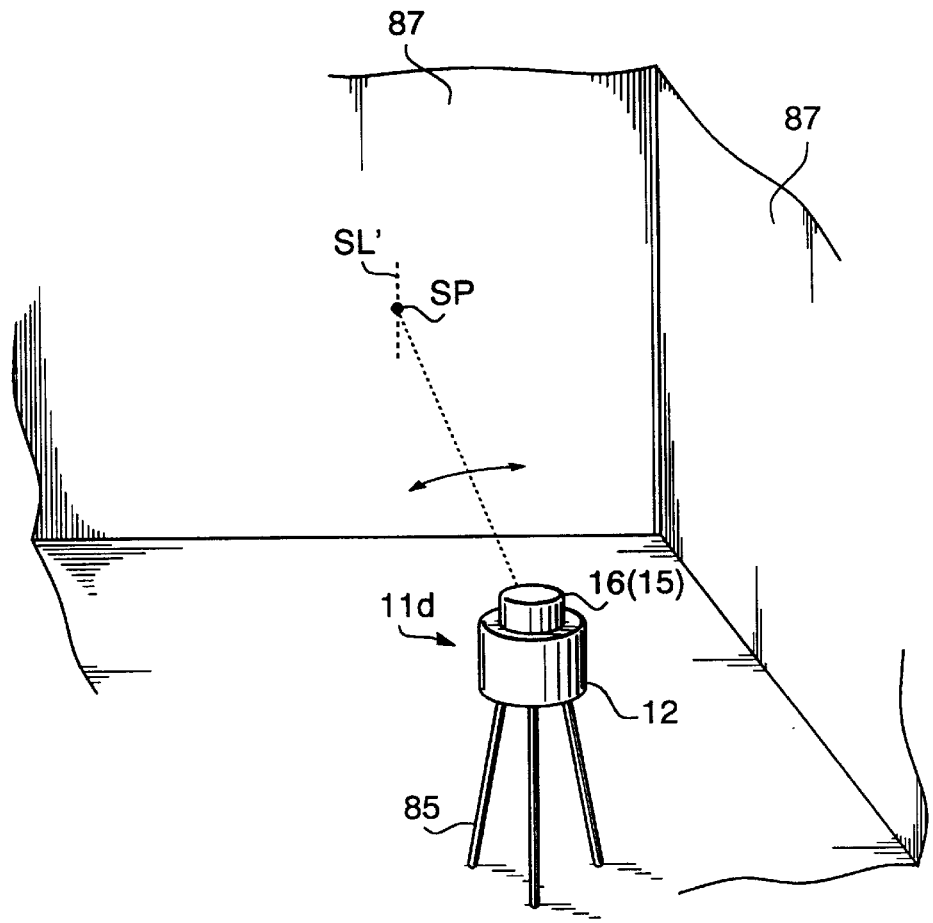
FIG. 47 is a perspective view of a laser marking device that is a variation of the fourth embodiment.

The laser marking device 11d shown in FIG. 47 is provided with the light diffracting element 201. The projected laser beam passes the transparent window of the upper housing 16 and forms a marking pattern on the wall 87. When the projecting unit 15 is not rotating, the marking pattern consists of a static reference dotted line SL' along the vertical direction and a spot SP. When the projecting unit 15 is not rotating, the marking pattern is formed as a dynamic reference line that is a locus of the spot SP as the exit direction of the laser beam changes due to the rotation of the projecting unit 15.

Figure 48:
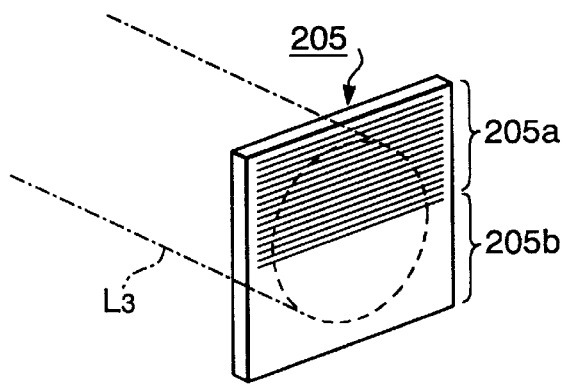
FIGS. 48 through 52 are perspective views of light diffracting elements that are variations of the fourth embodiment.
Figure 49:
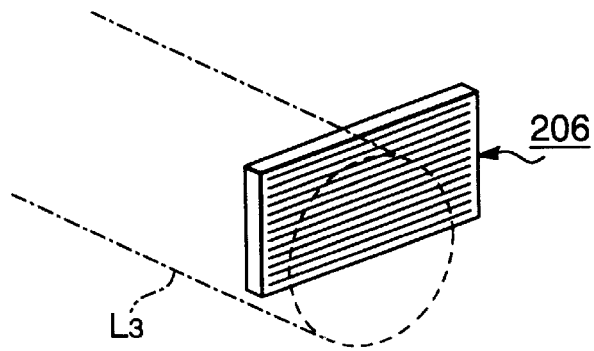

FIGS. 48 and 49 show still further variations of the light diffracting element of the fourth embodiment. In each of these variations, a grating portion is disposed at only one side of the cross section of the laser beam. In these variations, the direction of the static reference dotted line is also parallel to the vertical direction.

A light diffracting element 205 shown in FIG. 48 consists of a flat portion 205b having no power and a grating portion 205a having diffractive power located at one side of the flat portion 205b. The flat portion 205b covers a half of the cross section of the laser beam L3 and the grating portion 205a covers the other half of the cross section of the laser beam L3. The use of half of the cross section is given only as an example, the predetermined amount of coverage can be varied depending on the desired brightness of the static reference dotted line.

The portion of the laser beam L3 incident in the flat portion 205b of the light diffracting element 205 is not diffracted and passes through the element 205 to form a spot on a wall. The remaining portion of the laser beam L3 incident in the grating portion 205a is diffracted to form a static reference dotted line at both sides of the spot in a vertical direction on the wall.

A light diffracting element 206 shown in FIG. 49 is a grating plate that covers half of the cross section of the laser beam L3. The use of half of the cross section is given only as an example, the predetermined amount of coverage can be varied depending on the desired brightness of the static reference dotted line. The portion of the laser beam L3 that is not incident in the light diffracting element 206 forms a spot on a wall. The remaining portion of the laser beam L3 incident in the light diffracting element 206 is diffracted to form a static reference dotted line at both sides of the spot in a vertical direction on the wall.

Figure 50:
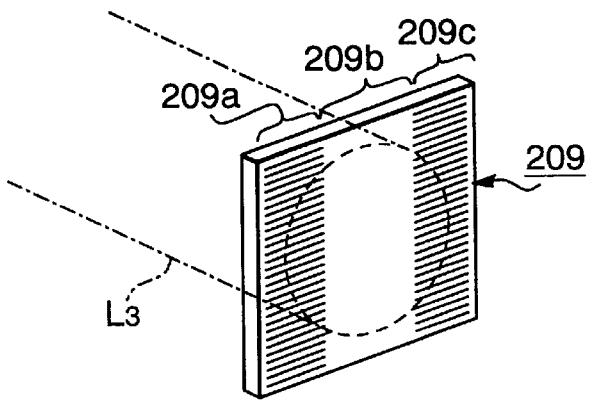
Figure 51:
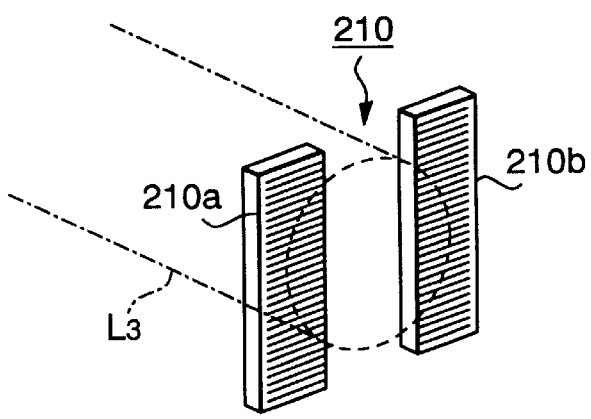

FIGS. 50 and 51 show still other variations of the light diffracting element 200 of the fourth embodiment. In each of these variations, grating portions are disposed at two sides of the cross section of the laser beam in these variations, the direction of the static reference dotted line is also parallel to the vertical direction.

As shown in FIG. 50, a light diffracting element 209 is a one piece element having a central flat portion 209b and peripheral grating portions 209a and 209c that are located at the sides of the, flat portion 201b. These portions 209a, 209b and 209c have boundaries that are parallel to the vertical direction. The grating portions 209a and 209c have linear grating patterns where the direction of the grating lines is parallel to the horizontal direction. The grating portions 209a and 209c have diffractive power so that the laser beam is diffracted and spread in the vertical direction.

The central portion of the laser beam L3 incident in the central flat portion 209b of the light diffracting element 209 is not diffracted and passes through the element 209 to form a spot on the wall 87. The peripheral portions of the laser beam L3 incident in the grating portions 209a and 209c are diffracted by the element 209 and, in a focused state, the diffracted beams are aligned to form a single static reference dotted line at the sides of the spot in a vertical direction on the wall.

A light diffracting element 210 shown in FIG. 51 consists of a pair of grating plates 210a and 210b that have diffractive power in the vertical direction. The diffracting element 210 is a separated element that is equivalent to the light diffracting element 209 shown in FIG. 50 when the central flat portion 209b is removed from the element 209.

The function of the separated element 210 is substantially identical to the one piece element 209. That is, the portion of the laser beam that is transmitted through the space between the grating plates 210a and 210b forms a spot on the wall. The portions of the laser beam that are transmitted through the grating plates 210a and 210b are diffracted in the vertical direction, and in a focused state, form a single static reference dotted line on the wall in a vertical direction.

Figure 52:
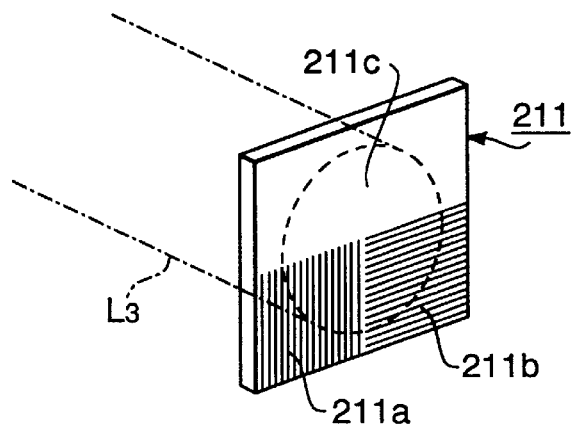
Figure 53:
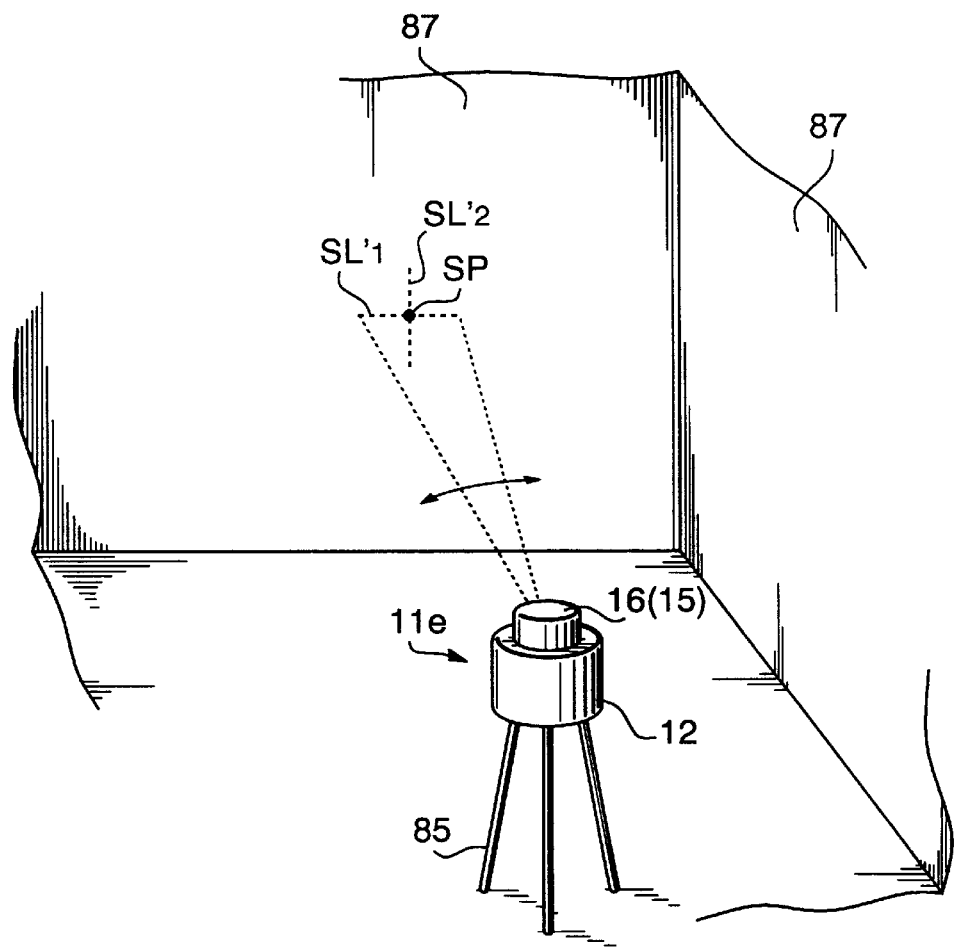
FIG. 53 is a perspective view of a laser marking device that is a variation of the fourth embodiment.

FIGS. 52 and 53 show further variations in which two static reference dotted lines are formed on a wall. The static reference dotted lines cross perpendicularly.

A light diffracting element 211 shown in FIG. 52 consists of first and second grating portions 211a and 211b, and a flat portion 211c. The directions of the grating lines of the grating portions 211a and 211b are perpendicular to each other. That is, the first grating portion 211a has a diffractive power in the horizontal direction and the second grating portion 211b has a diffractive power in the vertical direction.

The portion of the laser beam L3 incident in the flat portion 211c of the light diffracting element 211 forms a spot on a wall. The quarter portion of the remaining half of the laser beam L3 that is incident in the first grating portion 211a is diffracted to form a first static reference dotted line on the wall in a horizontal direction at the sides of the spot. The remaining quarter portion of the laser beam L3 that is incident in the second grating portion 211b is diffracted to form a second static reference dotted line in a vertical direction at the sides of the spot. The first static reference dotted line is perpendicular to the second static reference dotted line.

FIG. 53 shows the laser marking device 11e in which the light diffracting element 211 is attached to the lens holding portion 33 (FIG. 5). The first static reference dotted line SL1' projected on the wall 87 extends along the horizontal direction and the second static reference line SL2' extends along the vertical direction. The spot SP is formed at the crossing point of the two static reference dotted lines SL1' and SL2'.

Under the condition where the distance from the device 11e to the wall 87 is relatively short and the brightness of extraneous light is relatively low, the static reference dotted lines SL1' and SL2' can be seen by the naked eye. In order to mark a vertical line or a short horizontal line on the wall 87, the position of the static reference lines SL1' and SL2' is adjusted using the rotating position adjusting button 100 (FIG. 6), and then a user may trace one of the static reference dotted lines SL1' or SL2' using a marker or the like.

On the other hand, when a larger or full arc horizontal reference line is required, the selection switch 98 (FIG. 6) is turned ON to rotate the projecting unit 15 and a dynamic reference line is formed as the locus of the spot SP. Under the condition of a short distance and little extraneous light, the dynamic reference line can be seen as the afterimage of the locus. If the dynamic reference line cannot be seen by the naked eye, the light position detecting device can be used to detect the position of the dynamic reference line.

Figure 54:
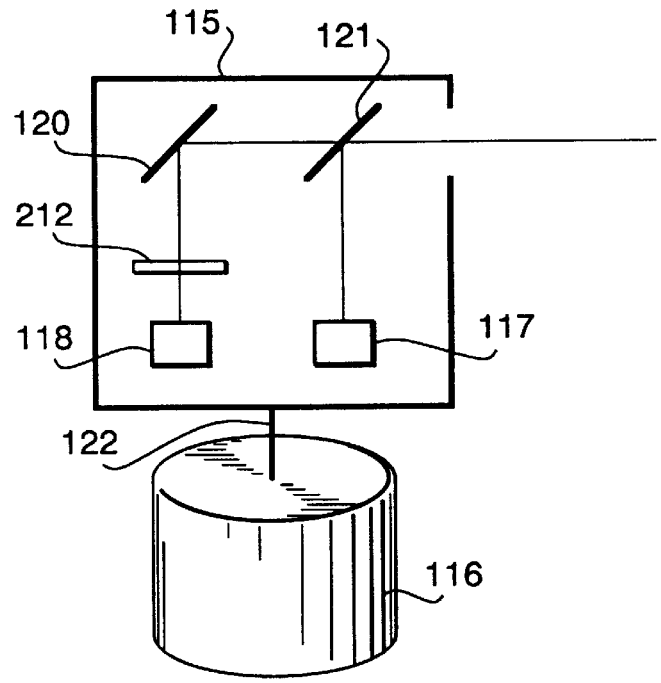
FIG. 54 is an outline drawing of a laser marking device of a fifth embodiment.
Figure 55:
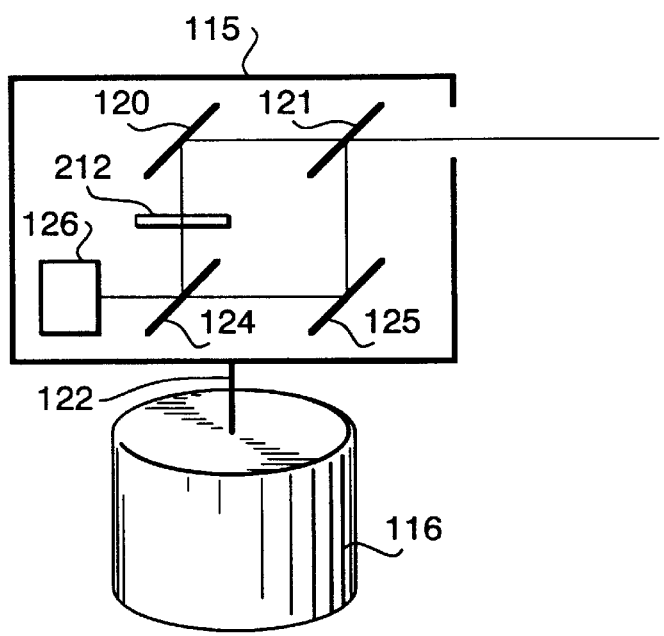
FIG. 55 is an outline drawing of a laser marking device of a sixth embodiment.

FIGS. 54 and 55 show fifth and sixth embodiments. In these embodiments, a diffraction grating is used to form a static reference dotted line as in the fourth embodiment, however, in these embodiments the optical paths on which the spot and the static reference dotted line are produced are completely separated. The diffraction grating that forms the static reference line is located in one of the separated optical paths. In these embodiments, the optical elements described are arranged in a projecting unit that is driven to rotate. A direction parallel to the rotating axis is defined as the vertical direction and a direction perpendicular to the vertical direction is defined as the horizontal direction.

FIG. 54 shows the fifth embodiment. A projecting unit 115 in which all of the optical elements are arranged is supported by a driving shaft 122 of a rotating motor 116. A laser beam emitted from a laser source 126 is divided by a first beam splitter 124. In order to make the laser beam parallel and circular in section, a collimator lens and a cylindrical lens (not shown) are used similar to those shown in FIG. 1.

The transmitted component through the first beam splitter 124 is reflected by the mirror 125 and directed toward a second beam splitter 121. The laser beam reflected by the mirror 125 and the second beam splitter 121 is projected to form a spot on the wall.

The component reflected by the first beam splitter 124 is diffracted by a diffraction grating 212 and reflected by a mirror 120 directed toward a second beam splitter 121. The diffraction grating 212 has a diffractive power in one direction (in this example, perpendicular to the page of the figure). And thus, the laser beam that exits from the diffraction grating 212 and penetrates the second beam splitter 121 is diffracted in the horizontal direction to form a static reference dotted line on the wall in a horizontal direction at the sides of the spot.

Under a condition where the distance from the laser marking device to the wall is relatively short and the brightness of extraneous light is relatively low, the static reference dotted line can be seen by the naked eye. In order to mark a short horizontal line on the wall, the position of the static reference dotted line is adjusted by driving the rotating motor 116 stepwise, and then a user may trace the static reference line using a marker or the like.

On the other hand, when a longer or full arc horizontal reference line is required, the rotating motor 116 is continuously driven to rotate the projecting unit 115 at a constant speed and a dynamic reference line is formed as the locus of the spot. Under the condition of a short distance and little extraneous light, the dynamic reference line can be seen as the afterimage of the locus. If the dynamic reference line cannot be seen by the naked eye, the light position detecting device can be used to detect the position of the dynamic reference line.

FIG. 55 shows the sixth embodiment. In this embodiment, two laser sources 117 and 118 are used. The general arrangement is similar to the fifth embodiment. A general construction similar to the second embodiment is used. A first optical system including the first laser source 117 comprises a collimator lens, a cylindrical lens and a beam expander that are applied similar to as shown in FIG. 1 (not shown). A second optical system including the second laser source 118 and a cylindrical lens 119 also comprises a collimator lens, a cylindrical lens and a beam expander that are applied similar to as shown in FIG. 1 (not shown).

A laser beam emitted from the first laser source 117 is reflected by the beam splitter 121 to form a spot on the wall. A laser beam emitted from the second laser source 118 is diffracted by the diffraction grating 212 and reflected by a mirror 120 directed toward the beam splitter 121. The diffraction grating 212 has a diffractive power in one direction (in this example, perpendicular to the page of the figure). Thus, the laser beam that exits from the diffraction grating 212 and penetrates the beam splitter 121 forms a static reference dotted line on the wall in a horizontal direction at the sides of the spot.

The operation of the device of the sixth embodiment is identical with that of the fifth embodiment.

The present disclosure relates to subject matter contained in Japanese Patent Application Nos. HEI 08-5118 filed on Jan. 16, 1996 and HEI 08-5119 filed on Jan. 16, 1996, which are expressly incorporated herein by reference in their entirety.

What is claimed is:

1. A laser marking device comprising:
    a laser source;
    an optical system for projecting a laser beam emitted from said laser source to form a laser spot on an object;
    a light distributing element that is disposed in the optical path of said optical system, said light distributing element including at least one light distributing portion that distributes a part of said laser beam to form a static reference line on said object such that said laser spot is formed on said static reference line;
    a rotating mechanism for rotating at least a part of said optical system such that a dynamic reference line is formed; and
    a switch for selecting between a rotation mode in which said rotating mechanism is activated and a stationary mode in which said rotating mechanism is not activated.

2. The laser marking device according to claim 1, wherein said light distributing portion of said light distributing element comprises a lens having power in one direction.

3. The laser marking device according to claim 2, wherein said lens is a cylindrical lens.

4. The laser marking device according to claim 3, wherein the orientation of said cylindrical lens is arranged such that said static reference line is parallel to said dynamic reference line.

5. The laser marking device according to claim 3, wherein the orientation of said cylindrical lens is arranged such that said static reference line is perpendicular to said dynamic reference line.

6. The laser marking device according to claim 3, wherein a pair of said cylindrical lenses are arranged to form two static reference lines and wherein one of said two static reference lines is parallel to said dynamic reference line and the other is perpendicular to said dynamic reference line.

7. The laser marking device according to claim 2, wherein said lens comprises a GRIN lens.

8. The laser marking device according to claim 7, wherein said GRIN lens is arranged to form said static reference line parallel to said dynamic reference line.

9. The laser marking device according to claim 1, wherein said light distribution portion of said light distributing element comprises a diffraction grating having power in one direction.

10. The laser marking device according to claim 9, wherein the orientation of said diffraction grating is arranged such that said static reference line is parallel to said dynamic reference line.

11. The laser marking device according to claim 9, wherein the orientation of said diffraction grating is arranged such that said static reference line is perpendicular to said dynamic reference line.

12. The laser marking device according to claim 9, wherein a pair of said diffraction gratings are arranged to form two static reference lines and wherein one of said two static reference lines is parallel to said dynamic reference line and the other is perpendicular to said dynamic reference line.

13. The laser marking device according to claim 1, wherein said light distributing portion covers a part of the cross section of said laser beam.

14. The laser marking device according to claim 13, wherein said light distributing portion is a cylindrical lens.

15. The laser marking device according to claim 14, wherein said cylindrical lens is a portion of a one piece element that includes a flat portion having no power and wherein said flat portion covers the other part of said cross section of said laser beam.

16. The laser marking device according to claim 14, wherein said light distributing element consists of at least one cylindrical lens that covers a part of the cross section of said laser beam.

17. The laser marking device according to claim 16, wherein a pair of said cylindrical lenses are positioned at both sides of a cross section of said laser beam.

18. The laser marking device according to claim 14, wherein said cylindrical lens comprises a one piece element having a through hole formed at the center thereof.

19. The laser marking device according to claim 13, wherein said light distributing portion of said light distributing element is a diffraction grating having power in one direction.

20. The laser marking device according to claim 19, wherein said diffraction grating is a portion of a one piece element that includes a flat portion having no power and wherein said flat portion covers the other part of said cross section of said laser beam.

21. The laser marking device according to claim 19, wherein said light distributing element consists of at least one diffraction grating that covers a part of a cross section of said laser beam.

22. The laser marking device according to claim 1, wherein said optical system has two optical paths that are combined by a beam splitter to be projected toward said object and wherein said light distributing element is disposed in at least one of said two optical path.

23. The laser marking device according to claim 22, wherein said light distributing element is a cylindrical lens.

24. The laser marking device according to claim 23, wherein said cylindrical lens is disposed in one of said two optical paths.

25. The laser marking device according to claim 23, wherein said cylindrical lens is disposed in each of said two optical paths to form two static reference lines that are perpendicular to each other.

26. The laser marking device according to claim 22, wherein said light distributing element is a diffraction grating having power in one direction.

27. The laser marking device according to claim 22, wherein said optical system includes beam splitter to divide the laser beam emitted from said laser source to form said two optical paths.

28. The laser marking device according to claim 1, wherein said dynamic reference line is formed along a horizontal direction.

29. A laser marking device comprising:
a first optical system including a first laser source for projecting a laser beam emitted from said first laser source to form a laser spot on an object;
a second optical system including a second laser source for projecting a laser beam emitted from said second laser source to form a static reference line on said object;
a beam splitter for combining laser beams emitted from said first and second laser sources such that said laser spot is formed on said static reference line;
a rotating mechanism for rotating at least a part of said optical systems such that a dynamic reference line is formed on said object; and
a switch for selecting between a rotation mode in which said rotating mechanism is activated and a stationary mode in which said rotating mechanism is not activated.

30. The laser marking device according to claim 29, wherein said second optical system comprises a cylindrical lens.

31. The laser marking device according to claim 30, wherein said first optical system comprises a light distributing element that includes at least one light distributing portion that distributes a part of said laser beam to form another static reference line on said object, wherein said static reference line and said another static reference line are perpendicular to each other.

32. The laser marking device according to claim 29, wherein said second optical system comprises a diffractive grating.

* * * * *